(12) United States Patent
Tao

(10) Patent No.: US 11,533,225 B2
(45) Date of Patent: Dec. 20, 2022

(54) METHOD, APPARATUS, AND SYSTEM FOR MONITORING NETWORK ACCESS STATE OF NETWORK DISTRIBUTION DEVICE

(71) Applicant: Alibaba Group Holding Limited, Grand Cayman (KY)

(72) Inventor: Zhen Tao, Hangzhou (CN)

(73) Assignee: Alibaba Group Holding Limited

( * ) Notice: Subject to any disclaimer, the term of this patent is extended or adjusted under 35 U.S.C. 154(b) by 0 days.

(21) Appl. No.: 16/797,757

(22) Filed: Feb. 21, 2020

(65) Prior Publication Data
US 2020/0195504 A1 Jun. 18, 2020

Related U.S. Application Data

(63) Continuation of application No. PCT/CN2018/101014, filed on Aug. 17, 2018.

(30) Foreign Application Priority Data

Aug. 22, 2017 (CN) .......................... 201710724461.7

(51) Int. Cl.
*H04L 41/0816* (2022.01)
*H04L 41/082* (2022.01)
(Continued)

(52) U.S. Cl.
CPC ........ *H04L 41/0816* (2013.01); *H04L 41/082* (2013.01); *H04L 41/0886* (2013.01);
(Continued)

(58) Field of Classification Search
CPC ............... H04L 41/0816; H04L 41/082; H04L 41/0886; H04L 41/12; H04L 69/22; H04W 84/12

See application file for complete search history.

(56) References Cited

U.S. PATENT DOCUMENTS 6,292,494 B1 * 9/2001 Baker .................... H04B 1/713
370/459
7,480,500 B1  1/2009 Mittal
(Continued)

FOREIGN PATENT DOCUMENTS

CN    101360010 A    2/2009
CN    104168625 A    11/2014
(Continued)

OTHER PUBLICATIONS

Wi-Fi Easy Connect Specification Version 2.0, 2020, Wi-Fi Alliance, pp. 1-226 (Year: 2020).*
(Continued)

*Primary Examiner* — Philip C Lee
(74) *Attorney, Agent, or Firm* — Lee & Hayes, P.C.

(57) ABSTRACT

A method including a network configuration device acquiring at least one channel including at least one of the following channels: a target channel and at least one initial channel, wherein the target channel is a channel used when the network distribution device is connected to a hotspot successfully; the network configuration device sending a request message to the network distribution device through the at least one channel; and the network configuration device determining, in the case of receiving a response packet, network state information of the network distribution device based on the response packet, wherein the network distribution device feeds back the response packet based on the request message. The present disclosure has solved the technical problem in the conventional techniques that users fail to determine whether the network distribution device has accessed a network successfully when the network distribution device is accessing the network.

20 Claims, 16 Drawing Sheets

NETWORK CONFIGURATION DEVICE SENDING REQUEST MESSAGE VIA EACH CHANNEL OF AT LEAST ONE CHANNEL SEQUENTIALLY, AND DETERMINING WHETHER RESPONSE MESSAGE IS RECEIVED; WHEREIN IF RESPONSE MESSAGE IS RECEIVED, STOPPING SENDING REQUEST MESSAGE VIA NEXT CHANNEL; OTHERWISE, CONTINUING TO SEND REQUEST MESSAGE VIA NEXT CHANNEL OF AT LEAST ONE CHANNEL TO DETERMINE WHETHER RESPONSE MESSAGE IS RECEIVED
S402

NETWORK CONFIGURATION DEVICE SENDING REQUEST MESSAGE TO NETWORK DISTRIBUTION DEVICE THROUGH AT LEAST ONE CHANNEL
S204

(51) Int. Cl.
*H04L 41/08* (2022.01)
*H04L 41/12* (2022.01)
*H04L 69/22* (2022.01)
*H04W 84/12* (2009.01)

(52) U.S. Cl.
CPC .............. *H04L 41/12* (2013.01); *H04L 69/22* (2013.01); *H04W 84/12* (2013.01)

(56) References Cited

U.S. PATENT DOCUMENTS

| | | | |
|---|---|---|---|
| 10,873,842 B2* | 12/2020 | McCann | H04W 12/50 |
| 2008/0076423 A1* | 3/2008 | Lee | H04W 36/08 455/436 |
| 2008/0096580 A1* | 4/2008 | Montemurro | H04L 12/66 455/456.1 |
| 2008/0140767 A1 | 6/2008 | Rao et al. | |
| 2009/0016333 A1 | 1/2009 | Wang et al. | |
| 2009/0262718 A1 | 10/2009 | Meier et al. | |
| 2011/0051693 A1* | 3/2011 | Hsu | H04W 12/069 370/332 |
| 2011/0173668 A1 | 7/2011 | Rooks et al. | |
| 2015/0139207 A1* | 5/2015 | Seok | H04W 48/16 370/338 |
| 2019/0035018 A1 | 1/2019 | Nolan et al. | |
| 2019/0132931 A1 | 5/2019 | Sharma et al. | |
| 2019/0342851 A1 | 11/2019 | Shan et al. | |
| 2019/0349261 A1 | 11/2019 | Smith et al. | |
| 2019/0387440 A1 | 12/2019 | Yiu et al. | |
| 2020/0008044 A1 | 1/2020 | Poornachandran et al. | |

FOREIGN PATENT DOCUMENTS

| | | |
|---|---|---|
| CN | 104601402 A | 5/2015 |
| CN | 106254147 A | 12/2016 |
| CN | 106255177 A | 12/2016 |
| CN | 106358147 | 1/2017 |
| CN | 106856443 A | 6/2017 |

OTHER PUBLICATIONS

Translation of International Search Report dated Oct. 30, 2018, from corresponding PCT Application No. PCT/CN2018/101014, 2 pages.
Translation of Written Opinion dated Oct. 30, 2018, from corresponding PCT Application No. PCT/CN2018/101014, 4 pages.
Machine translation copy of First Chinese Office Action dated Jun. 17, 2021 for Chinese patent application No. 201710724461.7, a counterpart foreign application of U.S. Appl. No. 16/797,757, 16 pages.
Machine Translation of First Chinese Office Action dated Jan. 29, 2022 for Chinese patent application No. 201710724461.7, a counterpart foreign application of U.S. Appl. No. 16/797,757, 6 pages.
Chinese Search Report dated Jun. 8, 2021 from corresponding CN Application No. 201710724461.7, 2 pages.
Copy of Chinese Search Report dated Jan. 23, 2022 from corresponding CN Application No. 201710724461.7, 1 page.
Chinese Office Action dated Jul. 25, 2022 from corresponding CN Application No. 201710724461.7, 5 pages.

* cited by examiner

NETWORK CONFIGURATION DEVICE SENDING REQUEST MESSAGE VIA EACH CHANNEL OF AT LEAST ONE CHANNEL SEQUENTIALLY, AND DETERMINING WHETHER RESPONSE MESSAGE IS RECEIVED; WHEREIN IF RESPONSE MESSAGE IS RECEIVED, STOPPING SENDING REQUEST MESSAGE VIA NEXT CHANNEL; OTHERWISE, CONTINUING TO SEND REQUEST MESSAGE VIA NEXT CHANNEL OF AT LEAST ONE CHANNEL TO DETERMINE WHETHER RESPONSE MESSAGE IS RECEIVED
S402

NETWORK CONFIGURATION DEVICE SENDING REQUEST MESSAGE TO NETWORK DISTRIBUTION DEVICE THROUGH AT LEAST ONE CHANNEL
S204

FIG. 4

NETWORK CONFIGURATION DEVICE SWITCHING TO TARGET CHANNEL TO SEND REQUEST MESSAGE IN CASE WHERE SELECTED CHANNEL IS TARGET CHANNEL
S5021

NETWORK CONFIGURATION DEVICE SWITCHING TO INITIAL CHANNEL TO SEND REQUEST MESSAGE IN CASE WHERE SELECTED CHANNEL IS INITIAL CHANNEL
S5023

NETWORK CONFIGURATION DEVICE SELECTING TARGET CHANNEL OR INITIAL CHANNEL BY TRAVERSING AT LEAST ONE CHANNEL
S502

FIG. 5

NETWORK CONFIGURATION DEVICE SWITCHING BETWEEN TARGET CHANNEL AND INITIAL CHANNEL TO SEND REQUEST MESSAGE, AND DETERMINING WHETHER RESPONSE MESSAGE IS RECEIVED; RECEIVING RESPONSE MESSAGE RETURNED BY NETWORK DISTRIBUTION DEVICE BY DIRECTLY SWITCHING TO INITIAL CHANNEL
S602

NETWORK CONFIGURATION DEVICE SENDING REQUEST MESSAGE TO NETWORK DISTRIBUTION DEVICE THROUGH AT LEAST ONE CHANNEL
S204

FIG. 6

NETWORK CONFIGURATION DEVICE ACQUIRING AT LEAST ONE CHANNEL, AT LEAST ONE CHANNEL INCLUDING AT LEAST ONE OF FOLLOWING CHANNELS: AT LEAST ONE INITIAL CHANNEL AND TARGET CHANNEL, WHEREIN TARGET CHANNEL IS CHANNEL USED WHEN NETWORK DISTRIBUTION DEVICE IS CONNECTED TO HOTSPOT SUCCESSFULLY
S902

NETWORK CONFIGURATION DEVICE RECEIVING RESPONSE MESSAGE RETURNED BY NETWORK DISTRIBUTION DEVICE USING ANY ONE OR MORE INITIAL CHANNELS, AND DETERMINING NETWORK STATE INFORMATION OF NETWORK DISTRIBUTION DEVICE BASED ON RESPONSE MESSAGE
S904

FIG. 9

METHOD, APPARATUS, AND SYSTEM FOR MONITORING NETWORK ACCESS STATE OF NETWORK DISTRIBUTION DEVICE

CROSS REFERENCE TO RELATED PATENT APPLICATIONS

This application claims priority to and is a continuation of PCT Patent Application No. PCT/CN2018/101014, filed on 17 Aug. 2018 and entitled "METHOD, DEVICE, AND SYSTEM FOR MONITORING NETWORK ACCESS STATE OF NETWORK DISTRIBUTION DEVICE," which claims priority to Chinese Patent Application No. 201710724461.7, filed on 22 Aug. 2017 and entitled "METHOD, APPARATUS, AND SYSTEM FOR MONITORING NETWORK ACCESS STATE OF NETWORK DISTRIBUTION DEVICE," which are incorporated herein by reference in their entirety.

TECHNICAL FIELD

The present disclosure relates to the communication field, and, more particularly, to methods, apparatuses, and systems for monitoring network access state of network distribution devices.

BACKGROUND

With the rapid development of communication technologies, the wireless local area network (WLAN) following the IEEE802.11 protocol standard has become widely used in various devices. Some of the devices have a screen (display screen), such as a mobile phone, a computer, and other smart terminal devices; and some of the devices have no screen, such as a smart air conditioner, a smart rice cooker, and other Internet of things devices.

In general, prior to using WLAN Internet of things devices, a WLAN network needs to be set. Generally, these WLAN Internet of things devices will often encounter many failures during connection to a WLAN hotspot, such as mismatching password, mismatching WLAN standard, and mismatching encryption manner, which will cause a connection failure. Because some Internet of things devices having no screen lack a friendly display interface, users fail to quickly and easily know whether a device after network distribution has been connected to a network successfully, where a failure arises, and the like.

At present, no effective solution has been proposed to solve the above problems.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

Example embodiments of the present disclosure provide methods, apparatuses, and systems for monitoring network access state of network distribution devices, to at least solve the technical problem in the conventional techniques that users fail to determine whether a network distribution device has accessed a network successfully when the network distribution device is accessing the network.

According to an example embodiment of the present disclosure, a method for monitoring a network access state of a network distribution device is provided, including: a network configuration device acquiring at least one channel, wherein the channel includes at least one of the following channels: a target channel and at least one initial channel, wherein the target channel is a channel used when the network distribution device is connected to a hotspot successfully and the initial channel is a channel used for the configuration information transmission; the network configuration device sending a request message to the network distribution device through the at least one channel; and the network configuration device determining, in the case of receiving a response packet, network state information of the network distribution device based on the response packet, wherein the network distribution device feeds back the response packet based on the request message.

According to an example embodiment of the present disclosure, a method for monitoring a network access state of a network distribution device is further provided, including: a network configuration device acquiring at least one channel, the channel including at least one of the following channels: a target channel and at least one initial channel, the target channel being a channel used when the network distribution device is connected to a hotspot successfully; and the network configuration device receiving a response packet returned by the network distribution device using any one or more initial channels, and determining network state information of the network distribution device based on the response packet, wherein the initial channel is a preset channel representing a connecting channel used by default when network connection between the network distribution device and the network configuration device is successful.

According to still an example embodiment of the present disclosure, a method for monitoring a network access state of a network distribution device is further provided, including: a network configuration device acquiring at least one channel, wherein the at least one channel includes at least one of the following channels: a target channel and at least one initial channel, wherein the target channel is a channel used when the network distribution device is connected to a hotspot successfully; the network configuration device sending a request message to the network distribution device using any one or more initial channels; and the network configuration device determining, in the case of receiving a response packet, network state information of the network distribution device based on the response packet, wherein the network distribution device feeds back the response packet based on the request message.

According to yet an example embodiment of the present disclosure, a system for monitoring a network access state of a network distribution device is further provided, including: the network distribution device; a network access device through which the network distribution device accesses a network; and a network configuration device located between the network distribution device and a gateway device, and configured to acquire at least one channel, and determine, after receiving a response packet returned by the network distribution device using any one or more initial channels, network state information of the network distribution device based on the response packet, the at least one channel including at least one of the following channels: a target channel and at least one initial channel, the target channel being a channel used when the network distribution device is connected to a hotspot successfully, the initial channel being a preset channel representing a connecting channel used by default when network connection between the network distribution device and the network configuration device is successful.

According to still yet an example embodiment of the present disclosure, a system for monitoring a network access state of a network distribution device is further provided, including: the network distribution device; a network access device through which the network distribution device accesses a network; and a network configuration device located between the network distribution device and a gateway device, and configured to acquire at least one channel, and determine, after sending a request message to the network distribution device using any one or more initial channels and in the case of receiving a response packet, network state information of the network distribution device based on the response packet, wherein the network distribution device feeds back the response packet based on the request message, the at least one channel includes at least one of the following channels: a target channel and at least one initial channel, and the target channel is a channel used when the network distribution device is connected to a hotspot successfully.

According to a further example embodiment of the present disclosure, an apparatus for monitoring a network access state of a network distribution device is further provided, including: a first acquiring module configured to acquire at least one channel, the at least one channel including at least one of the following channels: a target channel and at least one initial channel, the target channel being a channel used when the network distribution device is connected to a hotspot successfully; a first sending module configured to send a request message to the network distribution device through the at least one channel; and a first determining module configured to determine, in the case of receiving a response packet, network state information of the network distribution device based on the response packet, the network distribution device feeding back the response packet based on the request message.

According to still a further example embodiment of the present disclosure, an apparatus for monitoring a network access state of a network distribution device is further provided, including: a second acquiring module configured to acquire at least one channel, the channel including at least one of the following channels: a target channel and at least one initial channel, the target channel being a channel used when the network distribution device is connected to a hotspot successfully; and a first receiving module configured to receive a response packet returned by the network distribution device using any one or more initial channels, and determine network state information of the network distribution device based on the response packet, the initial channel being a preset channel representing a connecting channel used by default when network connection between the network distribution device and the network configuration device is successful.

According to yet a further example embodiment of the present disclosure, an apparatus for monitoring a network access state of a network distribution device is further provided, including: a third acquiring module configured for a network configuration device to acquire at least one channel, the at least one channel including at least one of the following channels: a target channel and at least one initial channel, the target channel being a channel used when the network distribution device is connected to a hotspot successfully; a second sending module configured to send a request message to the network distribution device using any one or more initial channels; and a second determining module configured to determine, in the case of receiving a response packet, network state information of the network distribution device based on the response packet, the network distribution device feeding back the response packet based on the request message.

According to yet still a further example embodiment of the present disclosure, a storage medium is further provided. The storage medium includes a stored program or computer-readable instructions, wherein the program, when running by one or more processors, controls a device where the storage medium is located to execute any one of the above methods for monitoring a network access state of a network distribution device.

According to an example embodiment of the present disclosure, a processor is further provided. The processor is configured to run a program or computer-readable instructions, wherein the program, when running, executes any one of the above methods for monitoring a network access state of a network distribution device.

According to still an example embodiment of the present disclosure, a processor; and a memory are further provided. The memory is connected to the processor for providing the processor with computer-readable instructions to process the following processing steps: a network configuration device acquiring at least one channel, wherein the at least one channel includes at least one of the following channels: a target channel and at least one initial channel, wherein the target channel is a channel used when the network distribution device is connected to a hotspot successfully; the network configuration device sending a request message to the network distribution device through the at least one channel; and the network configuration device determining, in the case of receiving a response packet, network state information of the network distribution device based on the response packet, wherein the network distribution device feeds back the response packet based on the request message.

In the example embodiments of the present disclosure, a network configuration device acquires at least one channel, the at least one channel including at least one of the following channels: a target channel and at least one initial channel, the target channel being a channel used when a network distribution device is connected to a hotspot successfully; the network configuration device sends a request message to the network distribution device through at least one channel; and the network configuration device determines, in the case of receiving a response packet, network state information of the network distribution device based on the response packet, the network distribution device feeding back the response packet based on the request message. The techniques of the present disclosure achieve viewing the network state information of the network distribution device via the network configuration device in real time, realize the technical effect of allowing users to clearly know whether an enrollee is connected to a network successfully, and then promptly take measures in the case of failure of the network distribution device to be connected to the network, and then solve the technical problem in the conventional techniques that the users fail to determine whether the network distribution device has accessed a network successfully when the network distribution device is accessing the network.

BRIEF DESCRIPTION OF THE DRAWINGS

The accompanying drawings described here are used to provide further understanding of the present disclosure and constitute a part of the present disclosure. The example embodiments of the present disclosure and the description of the example embodiments are used to illustrate the present disclosure, and do not constitute any improper limitation to the present disclosure. In the drawings:

FIG. 4 is a flowchart of an example method for monitoring a network access state of a network distribution device according to an example embodiment of the present disclosure;

FIG. 5 is a flowchart of an example method for monitoring a network access state of a network distribution device according to an example embodiment of the present disclosure;

FIG. 6 is a flowchart of an example method for monitoring a network access state of a network distribution device according to an example embodiment of the present disclosure;

FIG. 9 is a flowchart of a method for monitoring a network access state of a network distribution device according to an example embodiment of the present disclosure;

DETAILED DESCRIPTION

Figure 1:
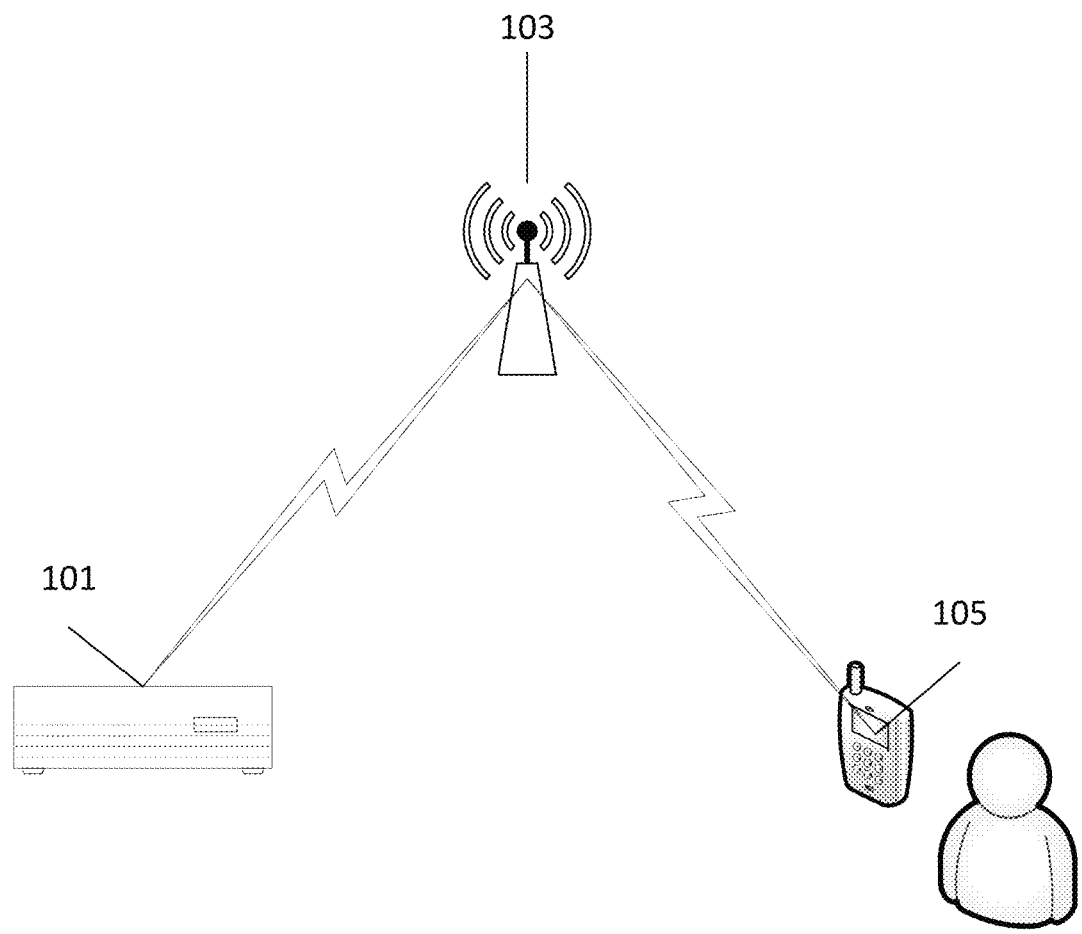
FIG. 1 is a schematic diagram of a system for monitoring a network access state of a network distribution device according to an example embodiment of the present disclosure.

In order to enable those skilled in the art to better understand the technical solutions of the present disclosure, such technical solutions will be clearly and completely described below with reference to the accompanying drawings in the example embodiments of the present disclosure. It is apparent that the example embodiments described merely represent some example embodiments rather than all example embodiments of the present disclosure. Based on the example embodiments in the present disclosure, all other example embodiments obtained by those of ordinary skill in the art without creative efforts should fall within the protection scope of the present disclosure.

It should be noted that terms such as "first" and "second" in the specification, claims, and accompanying drawings of the present disclosure are used for distinguishing similar objects, and do not necessarily describe any particular sequence or order. It should be understood that data used in such a manner may be interchanged in proper situations, so that the example embodiments of the present disclosure described here may be implemented in sequences other than those depicted or described here. In addition, the terms "include," "have" or any variations thereof are intended to cover non-exclusive inclusion. For example, a process, method, system, product or device including a series of steps or units not only may include the steps or units that are expressly listed, but also may include other steps or units that are not expressly listed or other steps or units inherent to the process, method, product or device.

First, the following explanations apply to some nouns or terms arising in the process of describing the example embodiments of the present disclosure:

The network configuration device is a device used for configuring a network, including but not limited to a mobile phone, a tablet computer, a notebook computer, a desktop computer, and the like. The network configuration device in example embodiments of the present disclosure may configure a network where one or more Internet of things devices access to a hotspot, and may acquire network state information of each Internet of things device, so as to determine whether a network distribution device assesses a hotspot successfully based on the network state information.

The network distribution device may also be referred to as enrollee, i.e., one or more devices to access a wireless local area network hotspot, and may be any Internet of things device based on a wireless local area network (WLAN) technology, including but not limited to a refrigerator, a washing machine, a kitchen appliance (an induction cooker, a microwave oven, a rice cooker, and a kitchen ventilator), an air conditioner, an air purifier, a table lamp, and other smart appliances.

DPP Action frame (the full name of DPP is Device Provisioning Protocol) is a special frame of WLAN network protocol formulated by WiFi Alliance. In this standard, a user may use a mobile phone to transmit a DPP wireless signal frame to the enrollee, and the enrollee is connected to a corresponding WLAN hotspot based on WLAN network information (WLAN ssid/key) in this frame.

The network state information refers to information of a network state of a hotspot to which the network distribution device is accessed, including but not limited to network connection state information.

A request message contains a dedicated frame of a DPP network protocol for acquiring the network state information (for example, WLAN connection state information) of the Internet of things device, and a DPP query request message sent by the network configuration device to the network distribution device, and is used for requesting for querying a WLAN connection state of the network distribution device.

A response packet contains the dedicated frame of the DPP network protocol for acquiring the network state information (for example, the WLAN connection state information) of the Internet of things device, and a DPP query response message sent by the network distribution device to the network configuration device, and is used for returning the WLAN connection state information of the network distribution device.

A target channel is a channel for connecting the network distribution device to the hotspot, i.e., a channel used in the case where the network distribution device is connected to the hotspot successfully.

An initial channel is at least one preset channel representing a connecting channel used by default when network connection between the network distribution device and the network configuration device is successful.

Example Embodiment 1

According to the example embodiments of the present disclosure, an example embodiment of a system for monitoring a network access state of a network distribution device is provided. This example embodiment may be applied to various Internet of things devices achieving information exchange and communication through a wireless local area network (e.g., WIFI) in Interwork of things. The Internet of things devices may be smart terminal devices, such as a computer, a mobile phone, a tablet computer, a notebook computer, a desktop computer, and a TV, or may be smart appliances, such as a refrigerator, a washing machine, a kitchen appliance (an induction cooker, a microwave oven, a rice cooker, and a kitchen ventilator), an air conditioner, an air purifier, and a table lamp.

WiFi is a technology capable of interconnecting terminals in a wireless manner, such as a personal computer and a handheld device (e.g., a Pad and a mobile phone). WiFi is a brand of wireless network communication technology, is owned by WiFi Alliance, and is intended to improve inter-community between wireless network products based on IEEE 802.11 standard. A local area network using a series of IEEE 802.11 protocols is referred to as the WiFi. Compared with Bluetooth, a transmission distance of the WiFi is no longer limited to as short as a few meters. For example, in open areas, a communication distance may reach 305 meters, and even in closed areas, the communication distance may still reach 76 meters to 122 meters, thereby greatly facilitating integration with the existing wired Ethernet, such that the networking cost is lower. In addition, the biggest advantage of the WiFi is a high transmission speed, which may reach 54 Mbps.

Compared with conventional wired networking employed by conventional smart home systems, application of the WIFI technology may reduce troublesome wiring, and has better expandability and mobility. Therefore, networking home appliances using the wireless local area network technology such as WiFi is not only an inevitable choice for the future development of smart home, but also an inevitable choice for the future market.

Taking an air conditioner based on the Internet of things as an example, a WiFi module is provided on the air conditioner to realize remote wireless control. Because the air conditioner based on the Internet of things may access the Internet through the WiFi technology, a user may connect the air conditioner to the Internet through GPRS/3G/WiFi by a mobile phone, a computer, a tablet computer, or the like, and then turn on the air conditioner via a software application program or a web version before returning home, such that the user has a comfortable environment after returning home. Then, the air conditioner is controlled based on cloud access. Sensors, such as a temperature sensor and a humidity sensor, are provided within the air conditioner. Temperature and humidity information at the user's home may be periodically transmitted to a web server through the WiFi technology. The user may access to the web server to know about an environmental state at home in real time, to change operation of the air conditioner. In addition, the user may replace the remote controller with a terminal device, such as a mobile phone, a computer, or a tablet computer. Taking the mobile phone as an example, when the mobile phone accesses a home local area network, or the mobile phone is directly connected to air-conditioning equipment peer to peer, controlling the operation of the air conditioner by the mobile phone may be realized. The existing remote controller is replaced with a smart terminal device, thereby avoiding the limitation of an infrared remote controller to directivity, such that the user may control the air conditioner at any corner of his home, thereby greatly improving the convenience and operability of household equipment.

With the popularization and promotion of the Internet, various home appliances with network functions in a house are connected to a local area network through a wireless technology, and connected to an external Internet. Building an intelligent and multifunctional modern smart home system will become a new fashion trend, and will be bound to be people's functional needs for the future home.

When the Internet of things devices are connected to a network, it is necessary to set a WLAN network of each Internet of things device. However, because many devices of the Internet of things devices have no display screen, the user cannot know whether the Internet of things device is connected to the network successfully. In the case of a failure in WLAN network configuration, it is impossible to quickly and easily know where the failure arises.

The inventors have found through researches that now the WiFi Alliance has formulated a network configuration standard (DPP). In this standard, a user may use a mobile phone to transmit a DPP wireless signal frame to an enrollee, and the enrollee is connected to a corresponding WLAN hotspot based on WLAN network information (WLAN ssid/key) in this frame. Because in the DPP standard, only authentication and configuration processes of a configurator (network configurator) and the enrollee are formulated, the configurator cannot know whether the enrollee has been connected to the network successfully, on completion of the configuration process. Therefore, if the network configuration device may send a request message for acquiring WLAN connection state information to the Internet of things device, and the Internet of things device returns a corresponding response packet, then the user may obtain network status of the enrollee in real time through the network configuration device (e.g., a mobile phone, or a computer), such that the user may clearly know whether network distribution is successful, or in the case of the network distribution failure, the user may also clearly know about the cause of the failure, thereby taking corresponding measures.

In the above application scene, as an example embodiment, FIG. 1 is a schematic diagram of a system for monitoring a network access state of a network distribution device according to an example embodiment of the present disclosure. As shown in FIG. 1, the device includes: a network distribution device 101, a network access device 103, and a network configuration device 105.

As an example embodiment, the network distribution device 101 may be a device to access a network, including but not limited to an Internet of things device based on a wireless local area network (WLAN) technology, including but not limited to a refrigerator, a washing machine, a kitchen appliance (an induction cooker, a microwave oven, a rice cooker, and a kitchen ventilator), an air conditioner, an air purifier, a table lamp, and other smart appliances.

The network access device 103 is configured for the network distribution device to access a network.

For example, the network access device may be a hotspot device configured to connect the network distribution device to a network, and may be a router, a gateway, or the like, or may be a smart terminal device (for example, a mobile phone, or a computer) that provides a hotspot.

The network configuration device 105 is configured to acquire at least one channel, send a request message to the network distribution device through the at least one channel, and determine, in the case of receiving a response packet, network state information of the network distribution device based on the response packet, wherein the network distribution device feeds back the response packet based on the request message, the channel includes at least one of the following channels: a target channel and at least one initial channel, and the target channel is a channel used when the network distribution device is connected to a hotspot successfully.

For example, the network configuration device 105 refers to a terminal device that may be configured to determine whether one or more network distribution devices to be connected to a network access the network successfully, including but not limited to a mobile phone, a tablet computer, a notebook computer, a desktop computer, and the like.

It should be noted that in the conventional techniques, when the network configuration device is configuring the network of the enrollee, the network configuration device sends a dedicated frame of a DPP network protocol to the enrollee, and the network distribution device is connected to a corresponding hotspot based on network information contained in the received dedicated frame of the DPP network protocol. On completion of the configuration process, the network configuration device cannot know whether the enrollee has been connected to the network successfully. The network configuration device in example embodiments of the present disclosure may also send a request message requesting for acquiring the network state information of the network distribution device to the network distribution device, and know whether the network distribution device accesses the hotspot successfully based on the network state information in the response packet returned by the network distribution device.

As may be seen from the above, in the above example embodiments of the present disclosure, when the network distribution device 101 accesses a network by the network access device 103, the network configuration device 105 acquires one or more channels for accessing the network distribution device 101 to the network, sends a request message for requesting network state information of the network distribution device 101 to the network distribution device 101 through the acquired channels, detects whether a response packet returned by the network distribution device 101 based on the request message is received, and determines the network state information of the network distribution device based on the response packet in the case of receiving the response packet. It is easy to observe that the channels acquired by the network configuration device 105 include one or more preset initial channels, and also include the target channel, wherein the target channel is a channel used when the network distribution device is connected to a hotspot successfully. Therefore, the network configuration device 105 may send the request message to the network distribution device 101 through any one channel of the initial channels and/or the target channel, and detect whether the response packet returned by the network distribution device 101 based on the request message is received.

The solution provided by the above example embodiments of the present disclosure achieves the purpose of viewing the network state information of the network distribution device via the network configuration device in real time, thereby realizing the technical effect of allowing users to clearly know whether the enrollee is connected to the network successfully, and then promptly take measures in the case of failure to be connected to the network, and then solving the technical problem in the conventional techniques that the users fail to determine whether the network distribution device has accessed a network successfully when the network distribution device is accessing the network.

It should be noted that, in order to acquire the network state information of the network distribution device, the network configuration device 105 needs to send the request message requesting for acquiring the network state information of the network distribution device to the network distribution device 101, and determine the network state information of the network distribution device based on the received response packet containing the network state information of the network distribution device and returned by the network distribution device 101. For example, manners of the network configuration device 105 sending the request message and the network distribution device 101 returning the response packet include, but are not limited to, four manners as follows: (1) the network configuration device sends the request message through the initial channel, and the network distribution device returns the response packet through the initial channel; (2) the network configuration device sends the request message through the target channel, and the network distribution device returns the response packet through the initial channel; (3) the network configuration device sends the request message through the initial channel, and the network distribution device returns the response packet through the target channel; and (4) the network configuration device sends the request message through the target channel, and the network distribution device returns the response packet through the target channel.

Here, it should be noted that the request message at least includes: a query request message requesting for acquiring the network state information of the network distribution device, and the response packet at least includes: a query response message containing the network state information of the network distribution device. For example, the query request message and the query response message may be sent by a network configuration message based on the DPP protocol standard.

In an example embodiment, when the network configuration device 105 is sending the request message to the network distribution device through the at least one preset initial channel or the target channel, the network configuration device 105 sends the request message on each channel of the at least one channel sequentially, and determines whether if the response packet is received; wherein if the response packet is received, sending the request message on a next channel is stopped, or otherwise, sending the request message on a next channel of the at least one channel is continued, and whether the response packet is received is determined.

Based on the above example embodiments, as an example implementation manner, the network configuration device 105 may be configured to select the target channel or the initial channel by traversing the at least one channel, and then switch to the target channel or the preset initial channel to send the request message. For example, in the case where the selected channel is the target channel, the network configuration device 105 may switch to the target channel to send the request message; and in the case where the selected channel is the initial channel, the network configuration device 105 may switch to the initial channel to send the request message.

For example, after the network configuration device 105 traverses each channel, and sends the request message requesting for acquiring the network state information of the network distribution device to the network distribution device 101 through the selected channel (the target channel or the initial channel), the network distribution device 101 may return the response packet through the target channel and/or the initial channel.

It should be noted that whether the network configuration device 105 sends the request message through the target channel, or sends the request message through the initial channel, the network configuration device 105 may receive the response packet returned from the network distribution device by directly switching to the initial channel irregularly.

Based on the above example embodiments, as an example implementation manner, the network configuration device 105 switches between the target channel or the initial channel sequentially to send the request message.

For example, in the case where the network configuration device 105 switches between the target channel and each initial channel sequentially to send the request message, the network distribution device 101 may return the response packet through the target channel and/or the initial channel, or receive the response packet returned from the network distribution device by directly switching to the initial channel.

As an example embodiment, based on any one of the above example embodiments, before the network configuration device 105 acquires the at least one channel, the network distribution device 101 is further configured to receive the network configuration message sent by the network configuration device 105; and if the receiving is successful, then the network distribution device 101 acquires hotspot information from the network configuration message, and initiates connection to the hotspot based on the hotspot information. In the case where the connection to the hotspot is successful, the network distribution device 101 switches to the target channel, and sends the response packet to the network configuration device 105 through the target channel.

For example, in the case where the network distribution device fails in receiving the network configuration message or the network distribution device fails in connection to the hotspot, the network distribution device sends the response packet to the network configuration device through the initial channel.

It should be noted that if the network distribution device does not receive the network configuration message (or fails in receiving the network configuration message), then the target channel is not likely to exist. In addition, even if the network distribution device receives the network configuration message, the connection to the hotspot may also fails due to other factors during the connection to the hotspot, and the target channel is not likely to exist, either. In this case, the network distribution device may send the response packet to the network configuration device through the initial channel, such that the network configuration device knows about the network state information of the network distribution device based on the response packet.

Based on the above example embodiments, before the network distribution device 101 receives the network configuration message sent by the network configuration device 105, the network distribution device 101 is further configured to preset at least one initial channel.

Example Embodiment 2

According to the example embodiments of the present disclosure, an example embodiment of a method for monitoring a network access state of a network distribution device is further provided. This example embodiment may be applied to the system for monitoring a network access state of a network distribution device in Example embodiment 1, including but not limited to the scene in Example embodiment 1. It should be noted that steps shown in the flowchart of the accompanying drawings may be performed in a computer system such as a group of computer executable instructions. Moreover, although a logic sequence is shown in the flowchart, the shown or described steps may be executed in a sequence different from the one shown here in some cases.

At present, in the existing network configuration standard DPP, a user may use a terminal device, such as a mobile phone, to send a DPP wireless signal frame (i.e., a network configuration message) to an enrollee, and the enrollee is connected to a corresponding WLAN hotspot based on WLAN information in the DPP wireless signal frame. However, because in the existing DPP standard, only authentication and configuration processes of a network configuration device and the enrollee are formulated, the network configuration device cannot know whether the enrollee has been connected to the network successfully, on completion of the configuration. That is, although the network configuration device sends the network configuration message, the enrollee is likely to receive relevant hotspot information and is connected to a target hotspot, or is likely to receive the information but is not connected the target hotspot due to incorrect information or network failure, or even is likely to fail in receiving this configuration frame.

Figure 2:
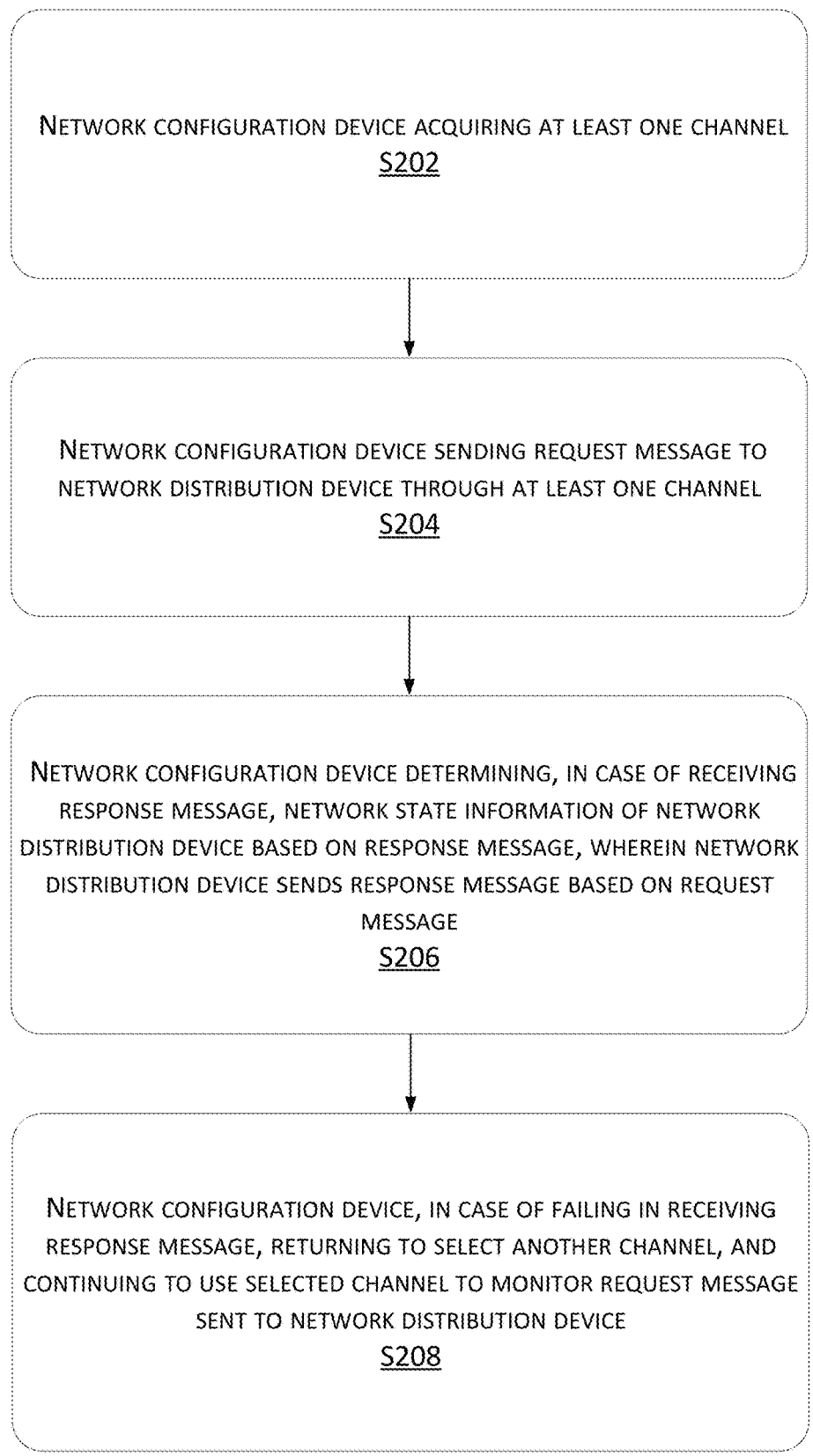
FIG. 2 is a flowchart of a method for monitoring a network access state of a network distribution device according to an example embodiment of the present disclosure.

In order to solve the above problems, the present disclosure provides an example embodiment of a method for monitoring a network access state of a network distribution device. FIG. 2 is a flowchart of a method for monitoring a network access state of a network distribution device according to an example embodiment of the present disclosure, including the following steps, as shown in FIG. 2:

Step S202: a network configuration device acquiring at least one channel, the channel including at least one of the following channels: a target channel and at least one initial channel, the target channel being a channel used when a network distribution device is connected to a hotspot successfully.

As an example embodiment, the network configuration device may be a device that is configured to configure a network for one or more network distribution devices to access a network, including but not limited to a mobile phone, a tablet computer, a notebook computer, a desktop computer, and the like. The above channel may be one or more pre-configured initial channels, or may be a channel for hotspot operation, i.e., a channel for connecting the network distribution device to the hotspot, which is called the target channel.

For example, the network configuration device is configured to configure one or more Internet of things devices based on a wireless local area network. These Internet of things devices may be provided with a screen, or may be provided with no screen, including but not limited to a refrigerator, a washing machine, a kitchen appliance (an induction cooker, a microwave oven, a rice cooker, and a kitchen ventilator), an air conditioner, an air purifier, a table lamp, and other smart appliances.

Step S204: the network configuration device sending a request message to a network distribution device through the at least one channel.

As an example embodiment, the above network distribution device may be a device to access a network, including but not limited to the Internet of things device based on the wireless local area network; and the above request message may be a request data packet for requesting network state information of the network distribution device. The network configuration device may monitor the request message sent to the network distribution device through any one channel of the initial channel and/or the target channel, and detect whether a response packet returned by the network distribution device based on the request message is received.

Figure 3:
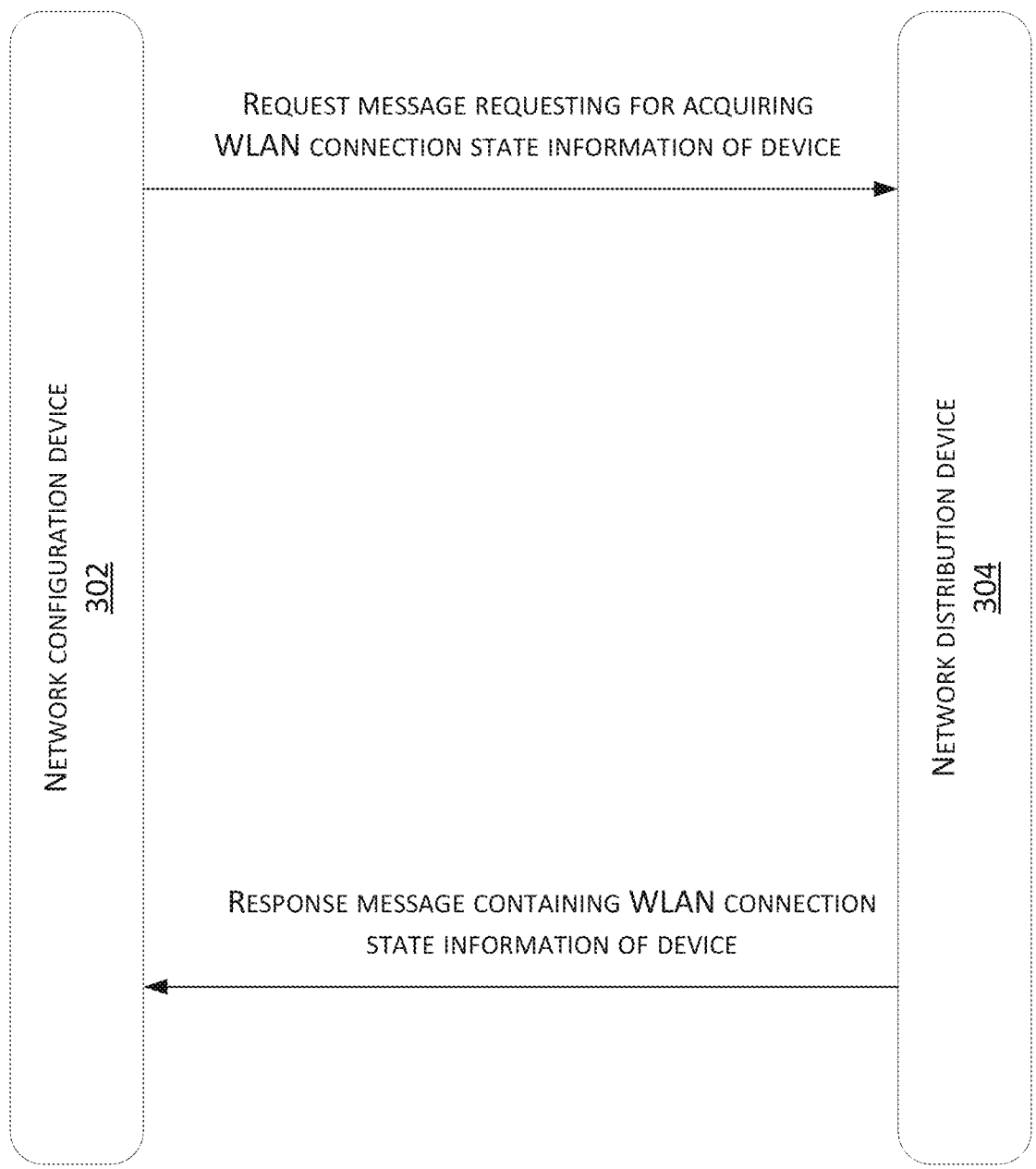
FIG. 3 is a schematic diagram of example system interaction between a network configuration device and a network distribution device according to an example embodiment of the present disclosure.

In an example embodiment, FIG. 3 is a schematic diagram of an example system interaction between a network configuration device and a network distribution device according to an example embodiment of the present disclosure. As shown in FIG. 3, in order to make the network configuration device 302 know whether an enrollee or the network distribution device 304 is connected to a network successfully, after the network configuration device 302 sends a network configuration message to the network distribution device 304, the network configuration device 302 may send a request message for acquiring WLAN network state information of the network distribution device 304 to the network distribution device 304. If the network distribution device is connected to the network successfully, then the network distribution device 304 will return a response packet containing the WLAN network state information of the network distribution device 304 to the network configuration device 302.

For example, the request frame and the response frame may be sent by the network configuration message based on a network configuration standard DPP.

Step S206: the network configuration device determining, in the case of receiving a response packet, network state information of the network distribution device based on the response packet, wherein the network distribution device feeds back the response packet based on the request message.

As an example embodiment, the above network state information may include, but is not limited to, network connection state information of the wireless local area network; and the above response packet may be a response data packet containing the WLAN network state information of the network distribution device returned by the network distribution device after receiving the request message for acquiring the WLAN network state information of the network distribution device information from the network configuration device.

Here, it should be noted that the above network state information may include not only the network state information of the wireless local area network, but also the network condition information of the wireless local area network (including but not limited to very good, good, poor, and very poor network conditions, etc.), and even in the case of network connection failure, may further include reasons for the network connection failure (for example, no network configuration message, network configuration message error, and device power failure).

In addition, it should be further noted that the above wireless local area network is only an example of the present disclosure. The solutions disclosed in the above steps S202 to S206 may be used for monitoring the network distribution device accessing any one or more of the following networks: wireless local area network, Internet, Bluetooth, RFID, Zigbee, NFC, etc.

For example, the above method may further include: Step S208: the network configuration device, in the case of failing in receiving the response packet, returning to select another channel, and continuing to use the selected channel to monitor the request message sent to the network distribution device.

It should be noted that, as an example embodiment, the above request message at least includes: a query request message requesting for acquiring the network state information of the network distribution device, and the response packet at least includes: a query response message containing the network state information of the network distribution device.

As may be seen from the above, in the above example embodiments of the present disclosure, the network configuration device acquires a target channel and/or at least one initial channel accessing the network through a network access device, sends the request message for requesting the network state information of the network distribution device to the network distribution device through the acquired channels, detects whether the response packet returned by the network distribution device based on the request message is received, and determines the network state information of the network distribution device based on the response packet in the case of receiving the response packet. It is easy to observe that the above channels include one or more initial channels, and also include the target channel, wherein the target channel is a channel used when the network distribution device is connected to a hotspot successfully. Therefore, the network configuration device may monitor the request message sent to the network distribution device through any one channel of the initial channels and/or the target channel, and detect whether the response packet returned by the network distribution device based on the request message is received.

The solution provided by the above example embodiments of the present disclosure achieves the purpose of viewing the network state information of the network distribution device via the network configuration device in real time, thereby realizing the technical effect of allowing users to clearly know whether the enrollee is connected to the network successfully, and then promptly take measures in the case of failure to be connected to the network, and then solving the technical problem in the conventional techniques that the users fail to determine whether the network distribution device has accessed a network successfully when the network distribution device is accessing the network.

In an example embodiment, the above network configuration device may also send the request message for requesting the network state information of the network distribution device to the network distribution device through at least one preset initial channel and/or a target channel. As shown in FIG. 4, the network configuration device sending the request message to the network distribution device through the at least one channel includes:

Step S402: the network configuration device sending the request message via each channel of the at least one channel sequentially, and determining whether the response packet is received; wherein if the response packet is received, stopping sending the request message via a next channel; otherwise, continuing to send the request message via a next channel of the at least one channel to determine whether the response packet is received.

For example, in the above example embodiments, the at least one channel includes a target channel and at least one initial channel, wherein the target channel is a channel used when the network distribution device is connected to a hotspot successfully. The network configuration device sends the request message on each channel of the at least one channel sequentially, and then determines whether the response packet returned from the network distribution device is received; stops sending the request message on a next channel if the response packet fed back by the network distribution device is received; or otherwise, continues sending the request message on a next channel of the at least one channel if the response packet fed back by the network distribution device is not received.

Assuming that the channels acquired by the network configuration device include the target channel (denoted as C) and n initial channels (c1, c2, . . . cn respectively), the network configuration device selects one channel from the n+1 channels to send the request message at will or based on a preset rule (for example, sending the request message sequentially in the order of the target channel and the initial channels), which is described taking sending the request message sequentially in the order of the target channel and the initial channels as an example. First, the network configuration device selects a channel C to send the request message, monitors whether a response packet from the network distribution device is received, stops sending the request message if receiving the response packet from the network distribution device; or if failing in receiving the response packet from the network distribution device, continues to select a next channel (i.e., the channel c1) to send the request message, and continues to monitor whether the response packet from the network distribution device is received, and so on, until the response packet from the network distribution device is received. For example, if the request message from the network distribution device has not been received yet until the channel cn is selected to send the response packet, then the network configuration device may continue to return to the first channel to send the request message, and monitor whether the response packet from the network distribution device is received.

According to the above example embodiments, the network configuration device may send the request message on each channel of the above at least one channel sequentially, and stop sending the request message on a next channel in the case of receiving the response packet returned from the network distribution device based on the request message, thereby saving the energy consumption of the system.

It should be noted that the above network configuration device may select the target channel or the initial channel by traversing the at least one channel, and then switch to the target channel or the preset initial channel to send the request message. As an example embodiment, as show in FIG. 5, the above method may further include: step S502: the network configuration device selecting the target channel or the initial channel by traversing the at least one channel.

For example, based on the above example embodiments, the above step S502 may include:

Step S5021: the network configuration device switching to the target channel to send the request message in the case where the selected channel is the target channel.

Step S5023: the network configuration device switching to the initial channel to send the request message in the case where the selected channel is the initial channel.

Based on the above example embodiments, the network configuration device may send the request message requesting the network state information of the network distribution device through the target channel or the preset initial channel connected to the hotspot successfully via the network distribution device.

It should be noted that no matter whether the network configuration device sends the request message through the target channel, or sends the request message through the initial channel, the network distribution device may switch to the initial channel and return a response packet corresponding to the request message, i.e., the network configuration device may receive the response packet returned from the network distribution device by directly switching to the initial channel irregularly.

In another example embodiment, as shown in FIG. 6, the network configuration device sending the request message to the network distribution device through the at least one channel includes:

Step S602: the network configuration device switching between the target channel and the initial channel to send the request message, and determining whether the response packet is received; the network configuration device receiving the response packet returned by the network distribution device by directly switching to the initial channel.

For example, in the above example embodiments, the network configuration device sends the request message to the network distribution device through the target channel or sends the request message through the preset initial channel, while the network distribution device switches to the preset initial channel after receiving the request message, and returns the corresponding response packet to the network configuration device. For example, the network distribution device may directly switch to the initial channel irregularly to return the response packet. Then, no matter whether the network configuration device sends the request message through the initial channel or sends the request message through the target channel, the network configuration device may receive the response packet from the network distribution device through the initial channel, and then acquire the network state information of the network distribution device based on the response packet.

Based on any one of the above example embodiments, taking the network configuration device and the network distribution device shown in FIG. 3 as an example, as an example embodiment, the implementation manners of the network configuration device sending the request message and the network distribution device returning the response packet include, but are not limited to, four implementation manners as follows:

Implementation manner I: the network configuration device sends the request message requesting for acquiring the network state information of the network distribution device to the network distribution device through the preset initial channel, and the network distribution device returns the response packet containing the network state information of the network distribution device to the network configuration device through the initial channel.

Implementation manner II: the network configuration device sends the request message requesting for acquiring the network state information of the network distribution device to the network distribution device through the target channel, and the network distribution device returns the response packet containing the network state information of the network distribution device to the network configuration device through the initial channel.

Implementation manner III: the network configuration device sends the request message requesting for acquiring the network state information of the network distribution device to the network distribution device through the preset initial channel, and the network distribution device returns the response packet containing the network state information of the network distribution device to the network configuration device through the target channel.

Implementation manner IV: the network configuration device sends the request message requesting for acquiring the network state information of the network distribution device to the network distribution device through the target channel, and the network distribution device returns the response packet containing the network state information of the network distribution device to the network configuration device through the target channel.

Based on the above example embodiments, the network configuration device sends the request message to the network distribution device through any one channel of the target channel or the preset initial channel, and the network distribution device may also return the response packet through any one channel of the target channel or the preset initial channel.

It is easy to observe that if the network distribution device is connected to the hotspot, then the network distribution device may not stay in its preset initial channel, but will switch to the target channel, wherein the target channel is a channel used when the network distribution device is connected to the hotspot successfully. Therefore, the network configuration device not only needs to send and receive subsequent request messages on the preset initial channel, but also needs to switch to a working channel of a target hotspot to send and receive subsequent information request messages.

Therefore, as another example embodiment, the above network configuration device may select the target channel and the at least one preset initial channel sequentially. The network configuration device switches between the target channel and each initial channel sequentially to send the request message, in the case where the sequentially selected channel is any one channel of each channel.

For example, the network distribution device may return the response packet through the target channel and/or the initial channel, in the case where the network configuration device switches between the target channel and each initial channel sequentially to send the request message.

It should be noted that in the case where the network configuration device switches to the target channel or the initial channel to send the request message, the network distribution device directly switches to the initial channel irregularly to send the response packet.

Based on the above example embodiments, the network configuration device may send the request message requesting the network state information of the network distribution device through any one channel of the target channel or the initial channel.

Figure 7:
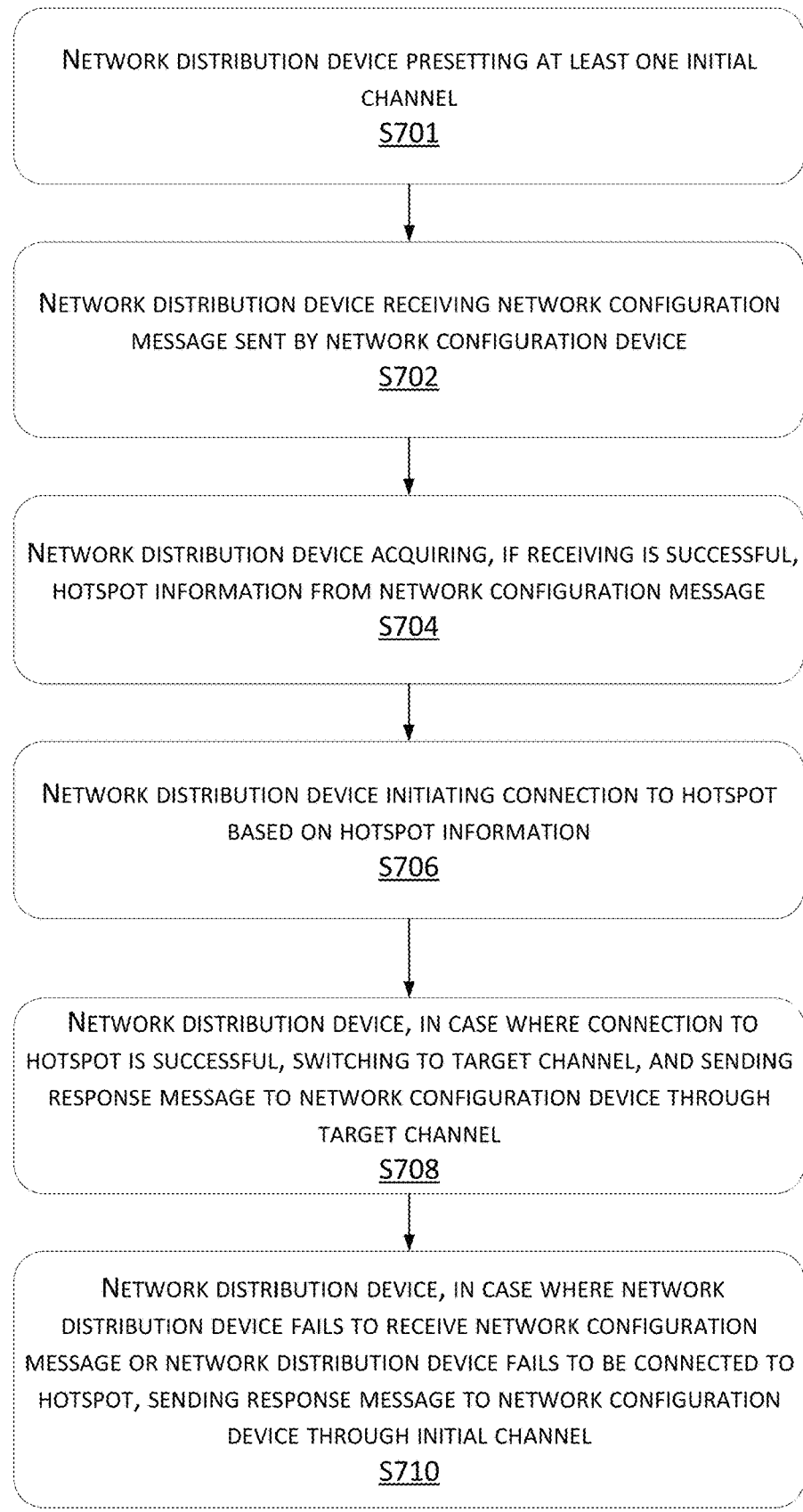
FIG. 7 is a flowchart of an example method for monitoring a network access state of a network distribution device according to an example embodiment of the present disclosure.

For example, according to any one of the above example embodiments, as shown in FIG. 7, before the network configuration device acquires the at least one channel, the above method may further include the following steps:

Step S702: the network distribution device receives a network configuration message sent by the network configuration device;

Step S704: the network distribution device acquires, if the receiving is successful, hotspot information from the network configuration message;

Step S706: the network distribution device initiates connection to a hotspot based on the hotspot information; and Step S708: the network distribution device, in the case where the connection to the hotspot is successful, switches to the target channel, and sending the response packet to the network configuration device through the target channel.

For example, in the above example embodiments, the network configuration device may be configured to configure network information of the network distribution device to access a network. For example, the network configuration message containing the hotspot information may be sent to the network distribution device to configure hotspot information of a hotspot to which a network distribution device to access a network is to access. Before the network configuration device acquires the at least one channel, the network configuration device will send a network configuration message for configuring the hotspot information to the network distribution device. After receiving the network configuration message sent by the network configuration device, the network distribution device acquires the hotspot information of the to-be-accessed hotspot from the network configuration message, and initiates the connection to the hotspot based on the hotspot information in the case of receiving the hotspot information of the to-be-accessed hotspot.

Through the above example embodiments, the purpose of configuring a to-be-accessed hotspot network for the network distribution device is achieved.

In another example embodiment, the above method further includes step S710: the network distribution device, in the case where the network distribution device fails to receive the network configuration message or the network distribution device fails to be connected to the hotspot, sends the response packet to the network configuration device through the initial channel.

For example, in the above example embodiments, in the case where the network distribution device fails in receiving the network configuration message or receives the network configuration message successfully, but fails in the connection to the hotspot, the network distribution device sends the response packet to the network configuration device through the initial channel.

For example, based on the above example embodiments, before the network distribution device receives the network configuration message sent by the network configuration device, the above method may further include step S701: the network distribution device presets the at least one initial channel.

Figure 8:
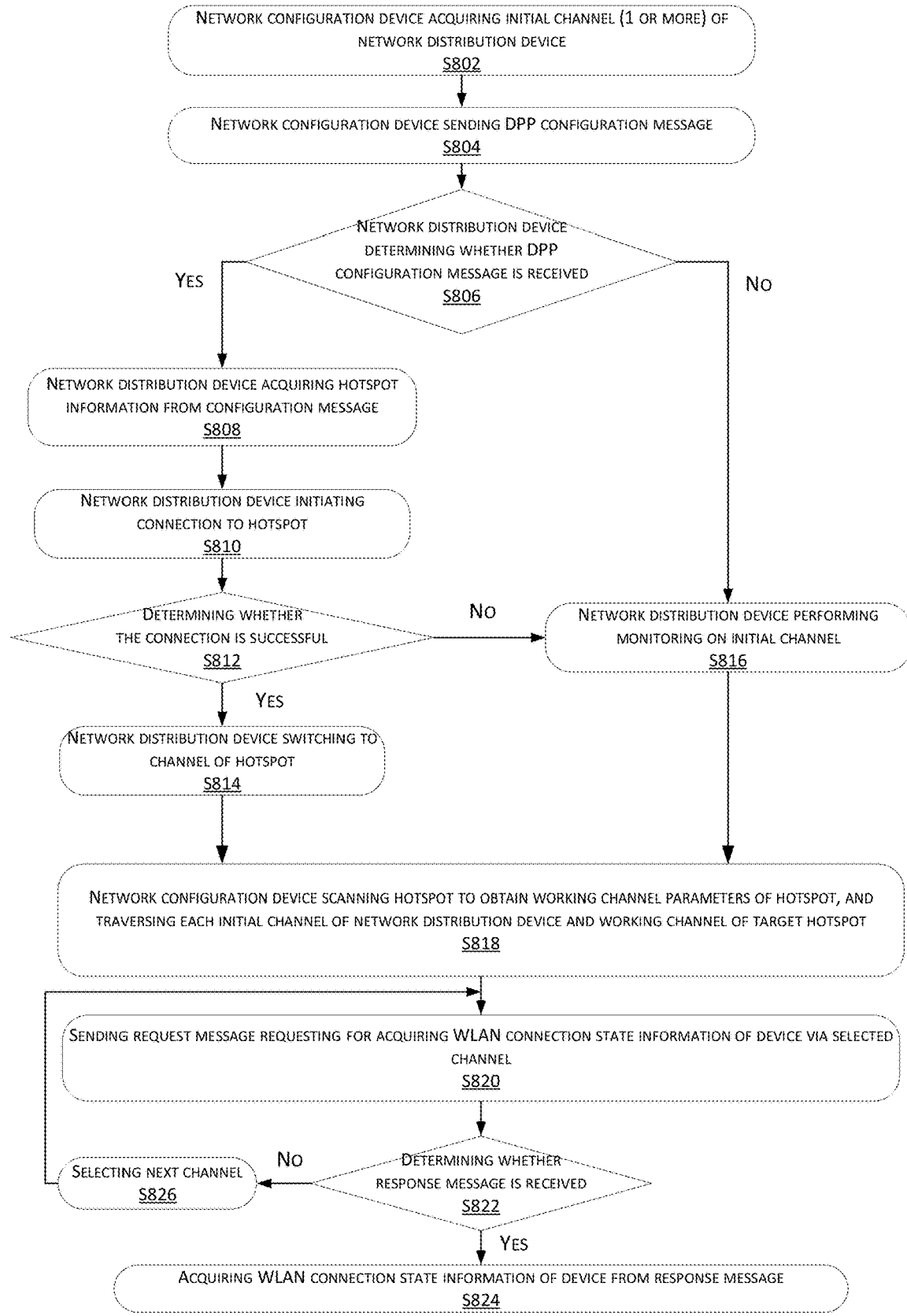
FIG. 8 is a flowchart of an example method for monitoring a network access state of a network distribution device according to an example embodiment of the present disclosure.

As an example embodiment, FIG. 8 is a flowchart of an example method for monitoring a network access state of a network distribution device according to an example embodiment of the present disclosure, including the following steps, as shown in FIG. 8:

Step S802: a network configuration device acquires an initial channel (1 or more) of a network distribution device (also referred to as an enrollee).

For example, in the above steps, when the network configuration device is configuring network settings of the network distribution device to access a network, the network configuration device acquires one or more pre-configured initial channels.

Step S804: the network configuration device sends a DPP configuration frame.

For example, in the above steps, the network configuration device sends a network configuration message containing hotspot information to the network distribution device through any one channel of the initial channels.

Step S806: the network distribution device determines whether the DPP configuration frame is received.

For example, in the above steps, after sending the network configuration message to the network distribution device through any one channel of the initial channels, the network configuration device determines whether a DPP configuration frame containing hotspot information is received, step S808 is executed if the DPP configuration frame containing the hotspot information is received; or step S816 is executed if the DPP configuration frame containing the hotspot information is not received.

Step S808: the network distribution device acquires hotspot information from a configuration frame.

For example, in the above steps, after receiving the DPP configuration frame containing the hotspot information, the network distribution device obtains the hotspot information from the DPP configuration frame.

Step S810: the network distribution device initiates connection to a hotspot.

For example, in the above steps, the network distribution device initiates the connection to the hotspot based on the hotspot information obtained from the DPP configuration frame.

Step S812: the network distribution device determines whether the connection is successful.

For example, in the above steps, after initiating the connection to the hotspot, the network distribution device determines whether the connection to the hotspot is successful, step S814 is executed if the connection to the hotspot is successful; or otherwise, step S816 is executed.

Step S814: the network distribution device switches to a channel of the hotspot.

For example, in the above steps, if the connection to the hotspot is successful, the network distribution device switches to the channel of the hotspot.

Step S816: the network distribution device performs monitoring on the initial channel.

For example, in the above steps, if failing in receiving the DPP configuration frame or failing in the connection to the hotspot, then the network distribution device monitors whether there is a request message requesting network state information of the network distribution device from the network configuration device on the initial channel.

Step S818: the network configuration device scans the hotspot to obtain working channel parameters of the hotspot, and traverses each initial channel of the network distribution device and a working channel of a target hotspot.

For example, in the above steps, the network configuration device may acquire the working channel parameters of the hotspot (i.e., channel parameters of the target channel) by scanning the hotspot, may acquire the target channel based on the channel parameters of the hotspot in the case of acquiring the channel parameters of the target channel, and then traverses each initial channel and the target channel to select a channel.

Step S820: the network configuration device sends a request message requesting for acquiring WLAN connection state information of a device via a selected channel.

For example, in the above steps, after selecting one channel from at least one preset initial channel and the target channel, the network configuration device sends a request message for requesting WLAN network state information of the network distribution device to the network distribution device through the channel.

Step S822: the network configuration device determines whether a response packet is received.

For example, in the above steps, after sending the request message requesting the WLAN network state information of the network distribution device to any one channel of the at least one preset initial channel or the target channel, the network configuration device determines whether a response packet from the network distribution device is received, executes step S824 if the response packet from the network distribution device is received; or otherwise, executes step S826.

Step S824: the network configuration device acquires the WLAN connection state information of the device from the response packet.

For example, in the above steps, after receiving the response packet from the network distribution device, the network configuration device acquires the WLAN connection state information of the device from the response packet.

Step S826: selecting a next channel if failing in receiving the response packet from the network distribution device, and returning to execute the above step S820.

For example, in the above steps, if failing in receiving the response packet from the network distribution device, the network configuration device selects a next channel to send the request message, and returns to execute the above step S820 until receiving the response packet from the network distribution device.

Example Embodiment 3

According to the example embodiments of the present disclosure, an example embodiment of a method for monitoring a network access state of a network distribution device is further provided. In this example embodiment, a network configuration device monitors the network distribution device directly through a preset initial channel or a target channel, and determines network state information of the network distribution device based on whether a response packet returned by the network distribution device is detected. It should be noted that steps shown in the flowchart of the accompanying drawings may be performed in a computer system such as a group of computer executable instructions. Moreover, although a logic sequence is shown in the flowchart, the shown or described steps may be executed in a sequence different from the one shown here in some cases.

The present disclosure provides an example embodiment of a method for monitoring a network access state of a network distribution device. FIG. 9 is a flowchart of a method for monitoring a network access state of a network distribution device according to an example embodiment of the present disclosure, including the following steps, as shown in FIG. 9:

Step S902: a network configuration device acquires at least one channel, wherein the at least one channel includes at least one of the following channels: a target channel and at least one initial channel, wherein the target channel is a channel used when a network distribution device is connected to a hotspot successfully.

Step S904: the network configuration device receives a response packet returned by the network distribution device using any one or more initial channels, and determines network state information of the network distribution device based on the response packet, wherein the initial channel is a preset channel representing a connecting channel used by default when the network connection between the network distribution device and the network configuration device is successful.

As may be seen from the above, in the above example embodiments of the present disclosure, after acquiring the target channel and the at least one initial channel, the network configuration device receives the response packet returned by the network distribution device through any one or more preset initial channels, and determines the network state information of the network distribution device based on the response packet. It is easy to observe that the network configuration device detects whether the response packet returned by the network distribution device based on the request message is received directly through the one or more preset initial channels without the need for switching to the target channel.

The solution provided by the above example embodiments of the present disclosure achieves the purpose of viewing the network state information of the network distribution device via the network configuration device in real time, thereby realizing the technical effect of allowing users to clearly know whether the enrollee is connected to the network successfully, and then promptly take measures in the case of failure to be connected to the network, and then solving the technical problem in the conventional techniques that the users fail to determine whether the network distribution device has accessed a network successfully when the network distribution device is accessing the network.

Example Embodiment 4

According to the example embodiments of the present disclosure, an example embodiment of a method for monitoring a network access state of a network distribution device is further provided. In this example embodiment, a network configuration device sends a request message to the network distribution device through a preset initial channel, receives a response packet returned by the network distribution device through any one channel of the preset initial channel or a target channel, and determines network state information of the network distribution device based on the received response packet. It should be noted that steps shown in the flowchart of the accompanying drawings may be performed in a computer system such as a group of computer executable instructions. Moreover, although a logic sequence is shown in the flowchart, the shown or described steps may be executed in a sequence different from the one shown here in some cases.

Figure 10:
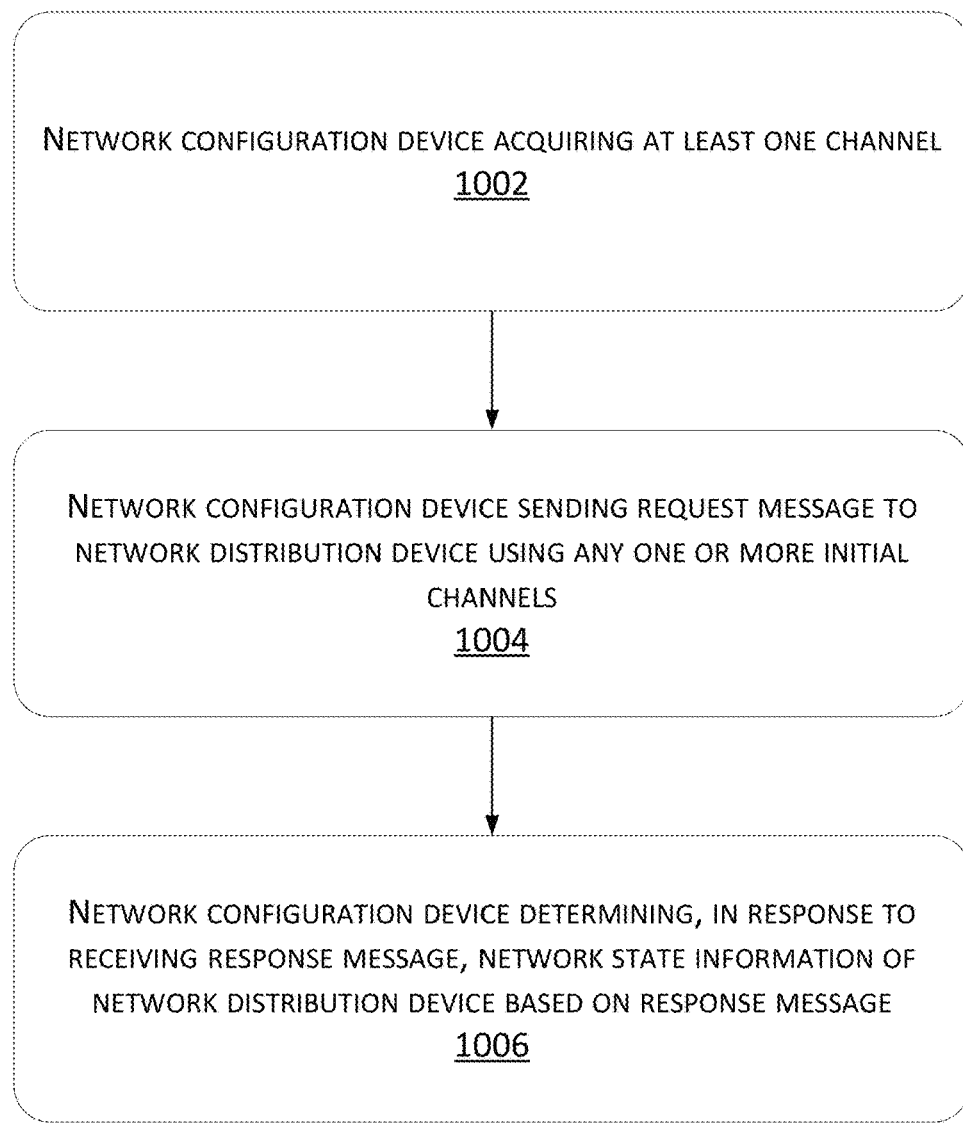
FIG. 10 is a flowchart of a method for monitoring a network access state of a network distribution device according to an example embodiment of the present disclosure.

The present disclosure provides an example embodiment of a method for monitoring a network access state of a network distribution device. FIG. 10 is a flowchart of a method for monitoring a network access state of a network distribution device according to an example embodiment of the present disclosure, including the following steps, as shown in FIG. 10:

Step S1002: a network configuration device acquires at least one channel, wherein the at least one channel includes at least one of the following channels: a target channel and at least one initial channel, wherein the target channel is a channel used when a network distribution device is connected to a hotspot successfully.

Step S1004: the network configuration device sends a request message to the network distribution device using any one or more initial channels.

Step S1006: the network configuration device determines, in response to receiving a response packet, network state information of the network distribution device based on the response packet, wherein the network distribution device feeds back the response packet based on the request message.

As may be seen from the above, in the above example embodiments of the present disclosure, after acquiring the target channel and the at least one initial channel, the network configuration device sends the request message to the network distribution device through any one or more preset initial channels, and determines the network state information of the network distribution device based on the response packet in the case of receiving the response packet from the network distribution device. It is easy to observe that the network configuration device sends the request message to the network distribution device directly through the one or more preset initial channels without the need for switching to the target channel.

The solution provided by the above example embodiments of the present disclosure achieves the purpose of viewing the network state information of the network distribution device via the network configuration device in real time, thereby realizing the technical effect of allowing users to clearly know whether the enrollee is connected to the network successfully, and then promptly take measures in the case of failure to be connected to the network, and then solving the technical problem in the conventional techniques that the users fail to determine whether the network distribution device has accessed a network successfully when the network distribution device is accessing the network.

It should be noted that the above method example embodiments are all expressed as a series of action combinations, for the ease of description. However, those skilled in the art should know that the present disclosure is not limited to the described action sequence, because some steps may be performed in other sequences or simultaneously according to the present disclosure. Then, those skilled in the art should also know that the example embodiments described in the specification are all preferred example embodiments, and the actions and modules involved are not mandatory in the present disclosure.

According to the above description of the implementation manners, those skilled in the art may clearly understand that the method for monitoring a network access state of a network distribution device according to the above example embodiments may be implemented by software plus a necessary universal hardware platform or implemented by hardware. However, in most cases, the former is a better implementation manner. Based on such understanding, the technical solutions in the present disclosure essentially or the part contributing to the conventional techniques may be embodied in the form of a software product, the computer software product may be stored in a storage medium (such as a ROM/RAM, a magnetic disk, or an optical disk), and include several instructions for instructing a terminal device (which may be a mobile phone, a computer, a server, a network device, or the like) to execute the methods in various example embodiments of the present disclosure.

Example Embodiment 5

Figure 11:
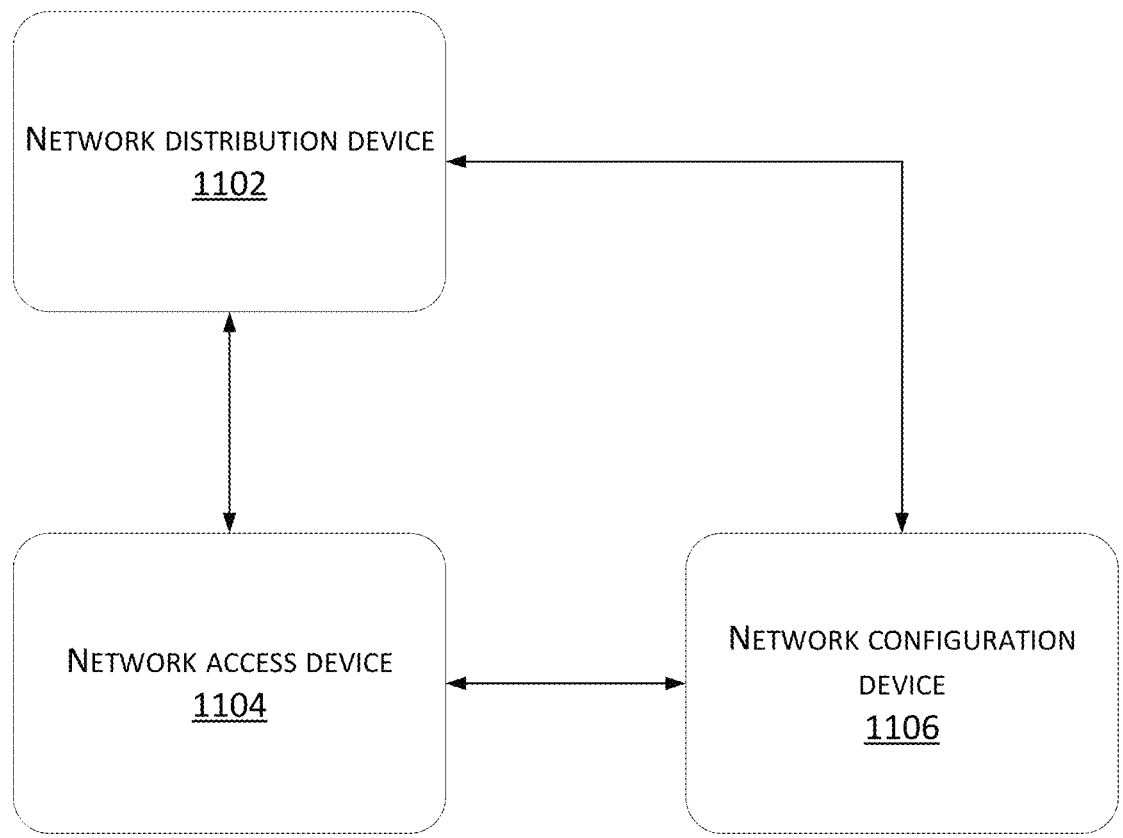
FIG. 11 is a schematic diagram of a system for monitoring a network access state of a network distribution device according to an example embodiment of the present disclosure.

According to the example embodiments of the present disclosure, an example embodiment of a system for implementing the method for monitoring a network access state of a network distribution device in the above Example embodiment 3 is further provided. FIG. 11 is a schematic diagram of a system for monitoring a network access state of a network distribution device according to an example embodiment of the present disclosure. As shown in FIG. 11, the system includes: a network distribution device 1102, a network access device 1104, and a network configuration device 1106.

As an example embodiment, the network distribution device 1102 may be an Internet of things device based on a wireless local area network (WLAN) technology;

the network access device 1104 is configured for the network distribution device to access a network; and the network configuration device 1106 is located between the network distribution device and a gateway device, and is configured to acquire at least one channel, and determine, after receiving a response packet returned by the network distribution device using any one or more initial channels, network state information of the network distribution device based on the response packet, wherein the channel includes at least one of the following channels: an initial channel and a target channel, the target channel is a channel used when the network distribution device is connected to a hotspot successfully, and the initial channel is a preset channel representing a connecting channel used by default when network connection between the network distribution device and the network configuration device is successful.

As may be seen from the above, in the above example embodiments of the present disclosure, when the network distribution device 1102 accesses a network by the network access device 1104, the network configuration device 1106 acquires one or more channels, and determines the network state information of the network distribution device after receiving the response packet returned by the network distribution device 1102 using the initial channel. It is easy to observe that the channels acquired by the network configuration device 1106 include one or more preset initial channels, and also include the target channel, wherein the target channel is a channel used when the network distribution device is connected to a hotspot successfully. However, the network configuration device 1106 may monitor the network distribution device 1102 through any one channel of the initial channels, and detect whether the response packet returned by the network distribution device 1102 based on the request message is received.

The solution provided by the above example embodiments of the present disclosure achieves the purpose of viewing the network state information of the network distribution device via the network configuration device in real time, thereby realizing the technical effect of allowing users to clearly know whether the enrollee is connected to the network successfully, and then promptly take measures in the case of failure to be connected to the network, and then solving the technical problem in the conventional techniques that the users fail to determine whether the network distribution device has accessed a network successfully when the network distribution device is accessing the network.

Example Embodiment 6

Figure 12:
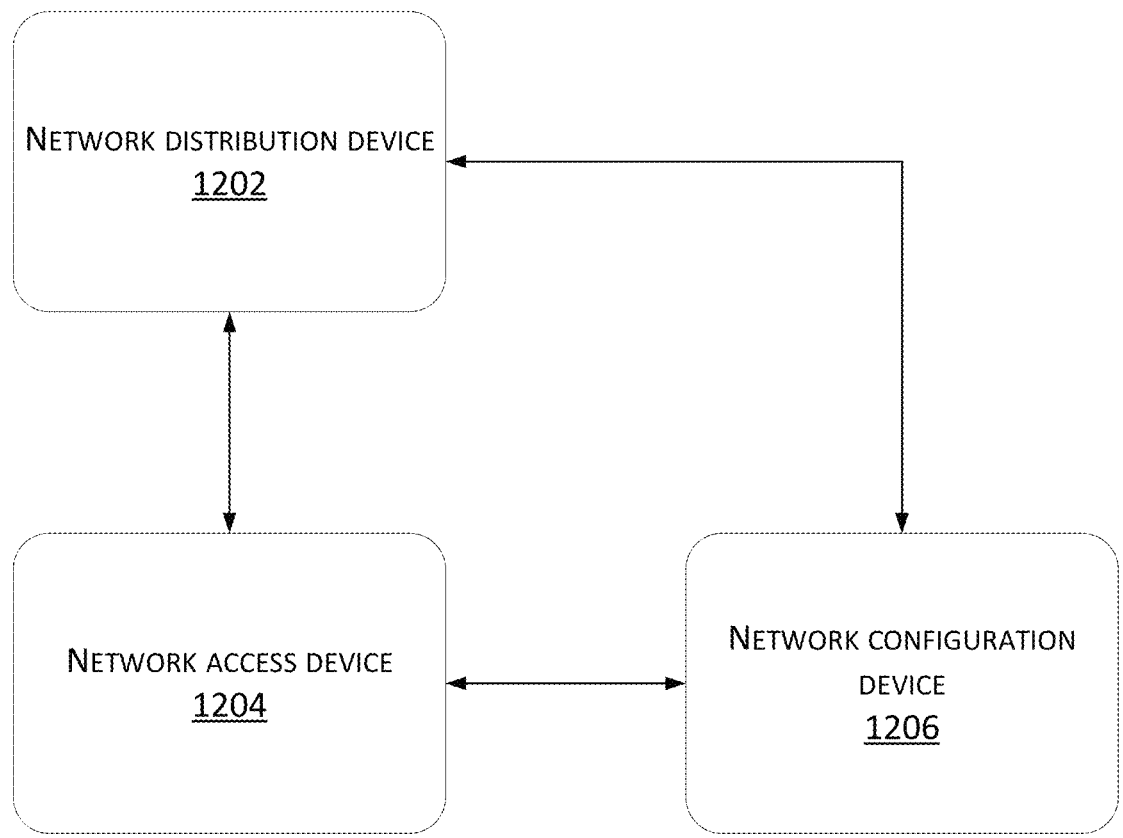
FIG. 12 is a schematic diagram of a system for monitoring a network access state of a network distribution device according to an example embodiment of the present disclosure.

According to the example embodiments of the present disclosure, an example embodiment of a system for implementing the method for monitoring a network access state of a network distribution device in the above Example embodiment 4 is further provided. FIG. 12 is a schematic diagram of a system for monitoring a network access state of a network distribution device according to an example embodiment of the present disclosure. As shown in FIG. 12, the system includes: a network distribution device 1202, a network access device 1204, and a network configuration device 1206.

As an example embodiment, the network distribution device 1202 may be an Internet of things device based on a wireless local area network (WLAN) technology;

the network access device 1204 is configured for the network distribution device to access a network; and the network configuration device 1206 is located between the network distribution device and a gateway device, and is configured to acquire at least one channel, and determine, after sending a request message to the network distribution device using any one or more initial channels and in the case of receiving a response packet, network state information of the network distribution device based on the response packet, wherein the network distribution device feeds back the response packet based on the request message, the channel includes at least one of the following channels: a target channel and at least one initial channel, and the target channel is a channel used when the network distribution device is connected to a hotspot successfully.

As may be seen from the above, in the above example embodiments of the present disclosure, when the network access device 1204 is connecting the network distribution device 1202 to a network, the network configuration device 1206 may acquire the target channel and the at least one initial channel, wherein the target channel is a channel used when the network distribution device is connected to a hotspot successfully. However, the network configuration device 1206 sends the request message to the network distribution device 1202 through any one or more preset initial channels, and determines the network state information of the network distribution device 1202 based on the response packet in the case of receiving the response packet from the network distribution device 1202. It is easy to observe that the network configuration device sends the request message to the network distribution device directly through the one or more preset initial channels without the need for switching to the target channel, wherein the target channel is a channel used when the network distribution device is connected to a hotspot successfully.

The solution provided by the above example embodiments of the present disclosure achieves the purpose of viewing the network state information of the network distribution device via the network configuration device in real time, thereby realizing the technical effect of allowing users to clearly know whether the enrollee is connected to the network successfully, and then promptly take measures in the case of failure to be connected to the network, and then solving the technical problem in the conventional techniques that the users fail to determine whether the network distribution device has accessed a network successfully when the network distribution device is accessing the network.

Example Embodiment 7

Figure 13:
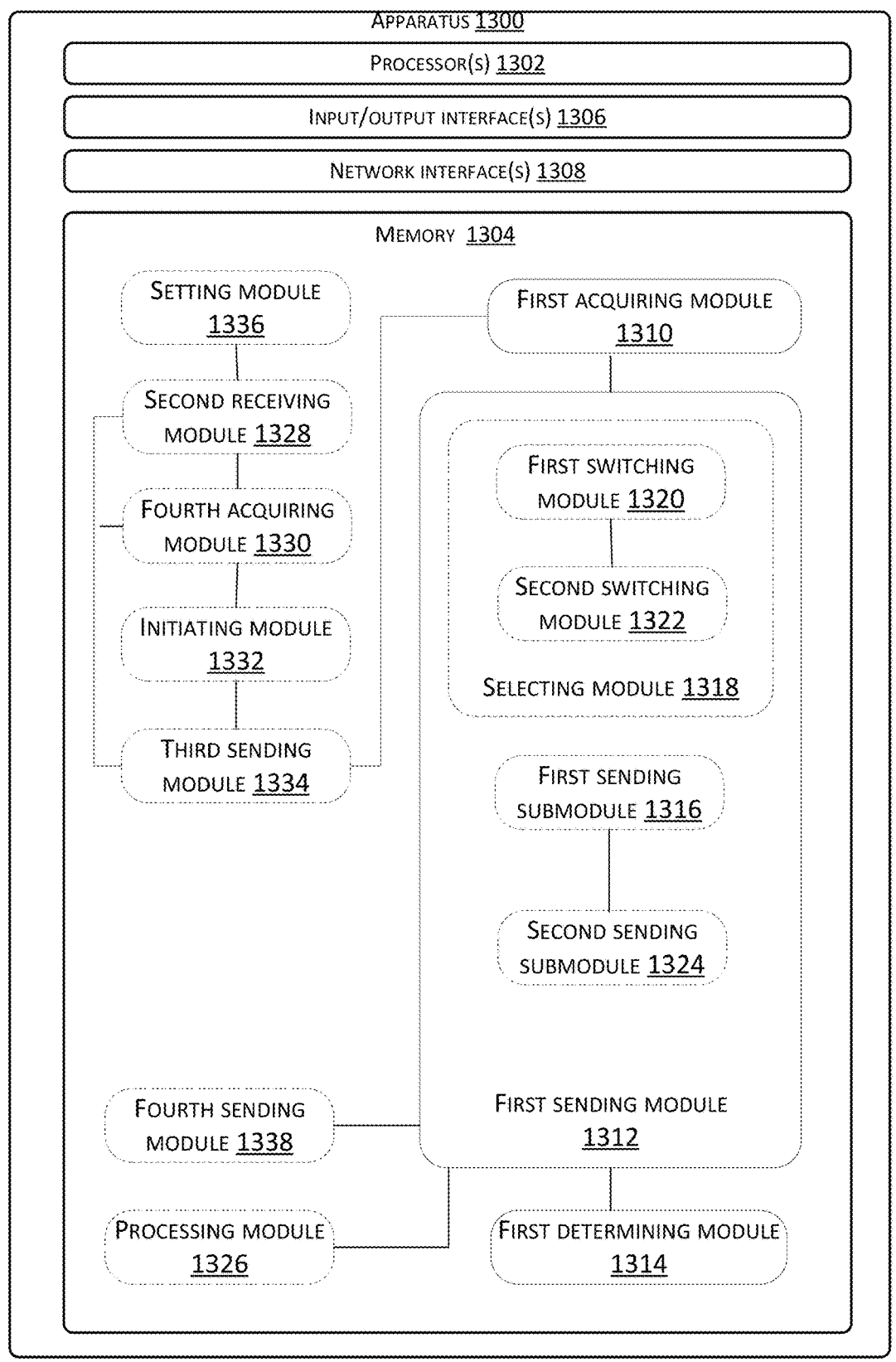
FIG. 13 is a schematic diagram of an apparatus for monitoring a network access state of a network distribution device according to an example embodiment of the present disclosure.

According to the example embodiments of the present disclosure, an example embodiment of an apparatus for implementing the method for monitoring a network access state of a network distribution device in the above Example embodiment 2 is further provided. FIG. 13 is a schematic diagram of an apparatus 1300 for monitoring a network access state of a network distribution device according to an example embodiment of the present disclosure. As shown in FIG. 13, the apparatus 1300 includes one or more processor(s) 1302 or data processing unit(s) and memory 1304. The apparatus 1300 may further include one or more input/output interface(s) 1306 and one or more network interface(s) 1308. The memory 1304 is an example of computer readable medium or media.

The computer readable medium includes non-volatile and volatile media as well as movable and non-movable media, and may store information by means of any method or technology. The information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and may be used to store information accessible to the computing device. According to the definition in this text, the computer readable medium does not include transitory media, such as a modulated data signal and a carrier.

The memory 1304 may store therein a plurality of modules or units including a first acquiring module 1310, a first sending module 1312, and a first determining module 1314.

The first acquiring module 1310 is configured to acquire at least one channel, wherein the channel includes at least one of the following channels: a target channel and at least one initial channel, and the target channel is a channel used when the network distribution device is connected to a hotspot successfully;

the first sending module 1312 is configured to send a request message to the network distribution device through the at least one channel; and the first determining module 1314 is configured to determine, in the case of receiving a response packet, network state information of the network distribution device based on the response packet, wherein the network distribution device feeds back the response packet based on the request message.

The first acquiring module 1310, the first sending module 1312, and the first determining module 1314 may perform acts correspond to step S202 to step S206 in Example embodiment 2. The examples implemented by and the application scenes of the above modules are identical to the examples implemented in and the application scenes of the corresponding steps, but are not limited to the contents disclosed in the above Example embodiment 2. It should be noted that the above modules, as a part of the apparatus, may be executed, e.g., in a computer system, such as a group of computer executable instructions.

As may be seen from the above, in the above example embodiments of the present disclosure, when the network configuration device is configuring network settings of the network distribution device to access a network, the first acquiring module 1310 acquires one or more channels on which the network distribution device accesses a network through a network access device, the first sending module 1312 sends a request message for requesting network state information of the network distribution device to the network distribution device through at least one channel, and detects whether a response packet returned by the network distribution device based on the request message is received, and the first determining module 1314 determines the network state information of the network distribution device based on the response packet in the case of receiving the response packet. It is easy to observe that the above at least one channel includes one or more preset initial channels, and also includes a target channel, wherein the target channel is a channel used when the network distribution device is connected to a hotspot successfully. Therefore, the network configuration device may send the request message to the network distribution device through any one channel of the initial channels and/or the target channel, and detect whether the response packet returned by the network distribution device based on the request message is received.

The solution provided by the above example embodiments of the present disclosure achieves the purpose of viewing the network state information of the network distribution device via the network configuration device in real time, thereby realizing the technical effect of allowing users to clearly know whether the enrollee is connected to the network successfully, and then promptly take measures in the case of failure to be connected to the network, and then solving the technical problem in the conventional techniques that the users fail to determine whether the network distribution device has accessed a network successfully when the network distribution device is accessing the network.

In an example embodiment, the first sending module 1312 includes: a first sending submodule 1316 configured for the network configuration device to send the request message on each channel of the at least one channel sequentially and determine whether the response packet is received; wherein if the response packet is received, stop sending the request message on a next channel; otherwise, continue to send the request message on a next channel of the at least one channel to determine whether the response packet is received.

The first sending submodule 1316 may perform acts corresponding to step S402 in Example embodiment 2. The examples implemented by and the application scenes of the above module are identical to the examples implemented in and the application scenes of the corresponding step, but are not limited to the contents disclosed in the above Example embodiment 2. It should be noted that the above modules, as a part of the apparatus, may be executed, e.g., in a computer system, such as a group of computer executable instructions.

In an example embodiment, the first sending module 1312 may further include: a selecting module 1318 configured to select the target channel or the initial channel by traversing at least one channel.

In an example embodiment, the above selecting module 1318 includes: a first switching module 1320 configured such that, in the case where the selected channel is the target channel, the network configuration device switches to the target channel to send the request message; and a second switching module 1322 configured such that, in the case where the selected channel is the initial channel, the network configuration device switches to the initial channel to send the request message.

The selecting module 1318, the first switching module 1320, and the second switching module 1322 may perform acts corresponding to steps S502, S5021, and S5023 in Example embodiment 2. The examples implemented by and the application scenes of the above modules are identical to the examples implemented in and the application scenes of the corresponding steps, but are not limited to the contents disclosed in the above Example embodiment 2. It should be noted that the above modules, as a part of the apparatus, may be executed, e.g., in a computer system, such as a group of computer executable instructions.

In an example embodiment, the first sending module 1312 further includes: a second sending submodule 1324 configured for the network configuration device to switch between the target channel and the initial channel to send the request message, and determine whether the response packet is received; wherein the network configuration device receives the response packet returned by the network distribution device by directly switching to the initial channel.

The second sending submodule 1324 may perform acts corresponding to step S602 in Example embodiment 2. The examples implemented by and the application scenes of the above module are identical to the examples implemented in and the application scenes of the corresponding step, but are not limited to the contents disclosed in the above Example embodiment 2. It should be noted that the above modules, as a part of the apparatus, may be executed, e.g., in a computer system, such as a group of computer executable instructions.

In an example embodiment, the memory 1304 further stores a processing module 1326 configured such that the network configuration device returns, in the case of failing in receiving the response packet, to select another channel, and continues to use the selected channel to monitor the request message sent to the network distribution device.

The processing module 1326 may perform acts corresponding to step S208 in Example embodiment 2. The examples implemented by and the application scenes of the above module are identical to the examples implemented in and the application scenes of the corresponding step, but are not limited to the contents disclosed in the above Example embodiment 2. It should be noted that the above modules, as a part of the apparatus, may be executed, e.g., in a computer system, such as a group of computer executable instructions.

In an example embodiment, the above request message at least includes: a query request message requesting for acquiring the network state information of the network distribution device, and the response packet at least includes: a query response message containing the network state information of the network distribution device.

In an example embodiment, the memory 1304 further stores: a second receiving module 1328 configured to receive a network configuration message sent by the network configuration device; a fourth acquiring module 1330 configured to acquire, if the receiving is successful, hotspot information from the network configuration message; an initiating module 1332 configured to initiate connection to the hotspot based on the hotspot information; and a third sending module 1334 configured to switch to the target channel, in the case where the connection to the hotspot is successful, and send the response packet to the network configuration device through the target channel.

The second receiving module 1328, the fourth acquiring module 1330, the initiating module 1332, and the third sending module 1334 may perform acts corresponding to steps S702 to S708 in Example embodiment 2. The examples implemented by and the application scenes of the above modules are identical to the examples implemented in and the application scenes of the corresponding steps, but are not limited to the contents disclosed in the above Example embodiment 2. It should be noted that the above modules, as a part of the apparatus, may be executed, e.g., in a computer system, such as a group of computer executable instructions.

In an example embodiment, the memory 1304 further stores: a setting module 1336 configured to preset the at least one initial channel.

The setting module 1336 may perform acts corresponding to step S701 in Example embodiment 2. The examples implemented by and the application scenes of the above module are identical to the examples implemented in and the application scenes of the corresponding step, but are not limited to the contents disclosed in the above Example embodiment 2. It should be noted that the above modules, as a part of the apparatus, may be executed, e.g., in a computer system, such as a group of computer executable instructions.

In another example embodiment, the memory 1304 further includes: a fourth sending module 1338 configured to send, in the case where the network distribution device fails to receive the network configuration message or the network distribution device fails to be connected to the hotspot, the response packet to the network configuration device through the initial channel.

The fourth sending module 1338 may perform acts corresponding to step S710 in Example embodiment 2. The examples implemented by and the application scenes of the above module are identical to the examples implemented in and the application scenes of the corresponding step, but are not limited to the contents disclosed in the above Example embodiment 2. It should be noted that the above modules, as a part of the apparatus, may be executed, e.g., in a computer system, such as a group of computer executable instructions.

Example Embodiment 8

Figure 14:
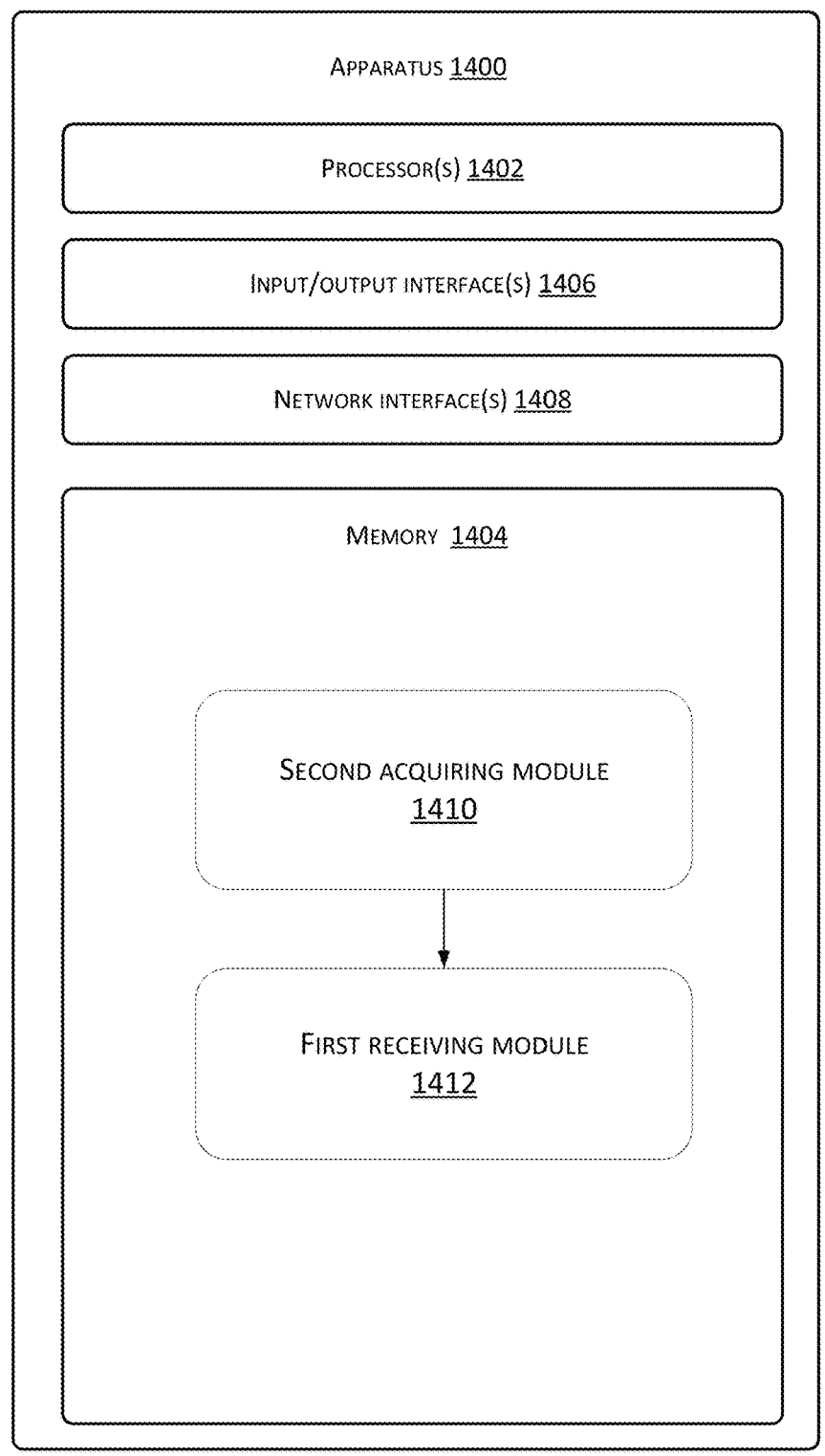
FIG. 14 is a schematic diagram of an apparatus for monitoring a network access state of a network distribution device according to an example embodiment of the present disclosure.

According to the example embodiments of the present disclosure, an example embodiment of an apparatus for implementing the method for monitoring a network access state of a network distribution device in the above Example embodiment 3 is further provided. FIG. 14 is a schematic diagram of an apparatus 1400 for monitoring a network access state of a network distribution device according to an example embodiment of the present disclosure.

As shown in FIG. 14, the apparatus 1400 includes one or more processor(s) 1402 or data processing unit(s) and memory 1404. The apparatus 1400 may further include one or more input/output interface(s) 1406 and one or more network interface(s) 1408. The memory 1404 is an example of computer readable medium or media.

The memory 1404 may store therein a plurality of modules or units including a second acquiring module 1410 and a first receiving module 1412.

The second acquiring module 1410 is configured to acquire at least one channel, wherein the channel includes at least one of the following channels: a target channel and at least one initial channel, and the target channel is a channel used when the network distribution device is connected to a hotspot successfully; and the first receiving module 1412 is configured to receive a response packet returned by the network distribution device using any one or more initial channels, and determine network state information of the network distribution device based on the response packet, wherein the initial channel is a preset channel representing a connecting channel used by default when network connection between the network distribution device and the network configuration device is successful.

The second acquiring module 1410 and the first receiving module 1412 may perform acts corresponding to step S902 to step S904 in Example embodiment 3. The examples implemented by and the application scenes of the above modules are identical to the examples implemented in and the application scenes of the corresponding steps, but are not limited to the contents disclosed in the above Example embodiment 3. It should be noted that the above modules, as a part of the apparatus, may be executed, e.g., in a computer system, such as a group of computer executable instructions.

As may be seen from the above, in the above example embodiments of the present disclosure, the second acquiring module 1410 acquires the target channel and the at least one initial channel, wherein the target channel is a channel used when the network distribution device is connected to a hotspot successfully. The first receiving module 1412 receives the response packet returned by the network distribution device through any one or more preset initial channels, and determines the network state information of the network distribution device based on the response packet. It is easy to observe that the network configuration device detects whether the response packet returned by the network distribution device based on the request message is received directly through the one or more preset initial channels without the need for switching to the target channel.

The solution provided by the above example embodiments of the present disclosure achieves the purpose of viewing the network state information of the network distribution device via the network configuration device in real time, thereby realizing the technical effect of allowing users to clearly know whether the enrollee is connected to the network successfully, and then promptly take measures in the case of failure to be connected to the network, and then solving the technical problem in the conventional techniques that the users fail to determine whether the network distribution device has accessed a network successfully when the network distribution device is accessing the network.

Example Embodiment 9

Figure 15:
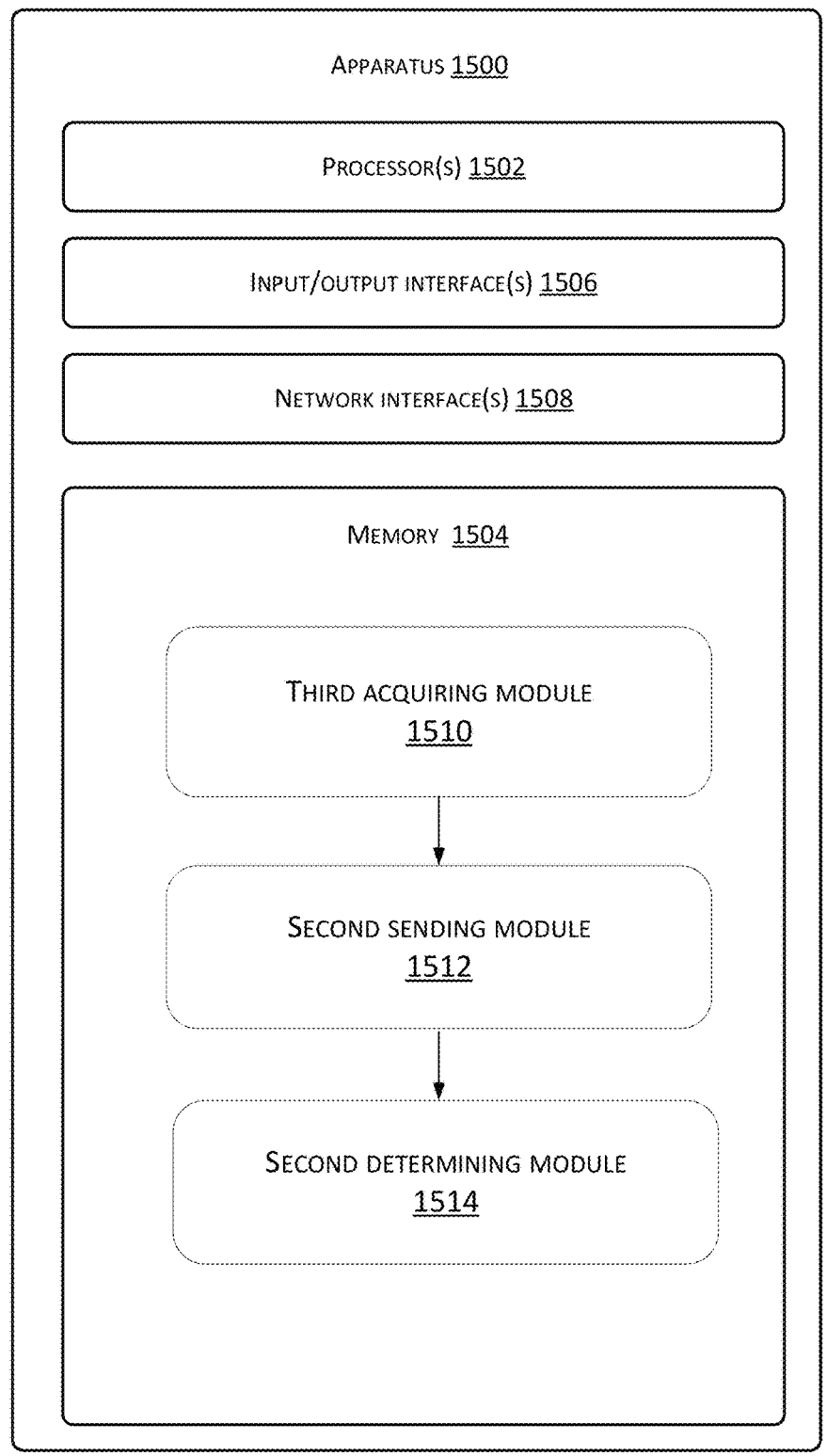
FIG. 15 is a schematic diagram of an apparatus for monitoring a network access state of a network distribution device according to an example embodiment of the present disclosure.

According to the example embodiments of the present disclosure, an example embodiment of an apparatus for implementing the method for monitoring a network access state of a network distribution device in the above Example embodiment 4 is further provided. FIG. 15 is a schematic diagram of an apparatus 1500 for monitoring a network access state of a network distribution device according to an example embodiment of the present disclosure. As shown in FIG. 15, the apparatus 1500 includes one or more processor(s) 1502 or data processing unit(s) and memory 1504. The apparatus 1500 may further include one or more input/output interface(s) 1506 and one or more network interface(s) 1508. The memory 1504 is an example of computer readable medium or media.

The memory 1504 may store therein a plurality of modules or units including a third acquiring module 1510, a second sending module 1512, and a second determining module 1514.

The third acquiring module 1510 is configured to acquire at least one channel, wherein the channel includes at least one of the following channels: a target channel and at least one initial channel, and the target channel is a channel used when the network distribution device is connected to a hotspot successfully;

the second sending module 1512 is configured to send a request message to the network distribution device using any one or more initial channels; and the second determining module 1514 is configured to determine, in the case of receiving a response packet, network state information of the network distribution device based on the response packet, wherein the network distribution device feeds back the response packet based on the request message.

The third acquiring module 1510, the second sending module 1512, and the second determining module 1514 may perform acts corresponding to step S1002 to step S1006 in Example embodiment 4. The examples implemented by and the application scenes of the above modules are identical to the examples implemented in and the application scenes of the corresponding steps, but are not limited to the contents disclosed in the above Example embodiment 4. It should be noted that the above modules, as a part of the apparatus, may be executed, e.g., in a computer system, such as a group of computer executable instructions.

As may be seen from the above, in the above example embodiments of the present disclosure, the third acquiring module 1510 acquires the target channel and the at least one initial channel, wherein the target channel is a channel used when the network distribution device is connected to the hotspot successful. The second sending module 1512 sends the request message to the network distribution device using any one or more preset initial channels. The second determining module 1514 determines the network state information of the network distribution device based on the response packet in the case of receiving the response packet from the network distribution device. It is easy to observe that the network configuration device sends the request message to the network distribution device directly through the one or more preset initial channels without the need for switching to the target channel.

The solution provided by the above example embodiments of the present disclosure achieves the purpose of viewing the network state information of the network distribution device via the network configuration device in real time, thereby realizing the technical effect of allowing users to clearly know whether the enrollee is connected to the network successfully, and then promptly take measures in the case of failure to be connected to the network, and then solving the technical problem in the conventional techniques that the users fail to determine whether the network distribution device has accessed a network successfully when the network distribution device is accessing the network.

Example Embodiment 10

The example embodiments of the present disclosure may provide a mobile terminal. The mobile terminal may be any mobile terminal device in a computer terminal group. For example, in this example embodiment, the mobile terminal may also be replaced with a terminal device, such as a mobile terminal.

For example, in this example embodiment, the mobile terminal may be at least one access device in a plurality of network devices located in a computer network.

Figure 16:
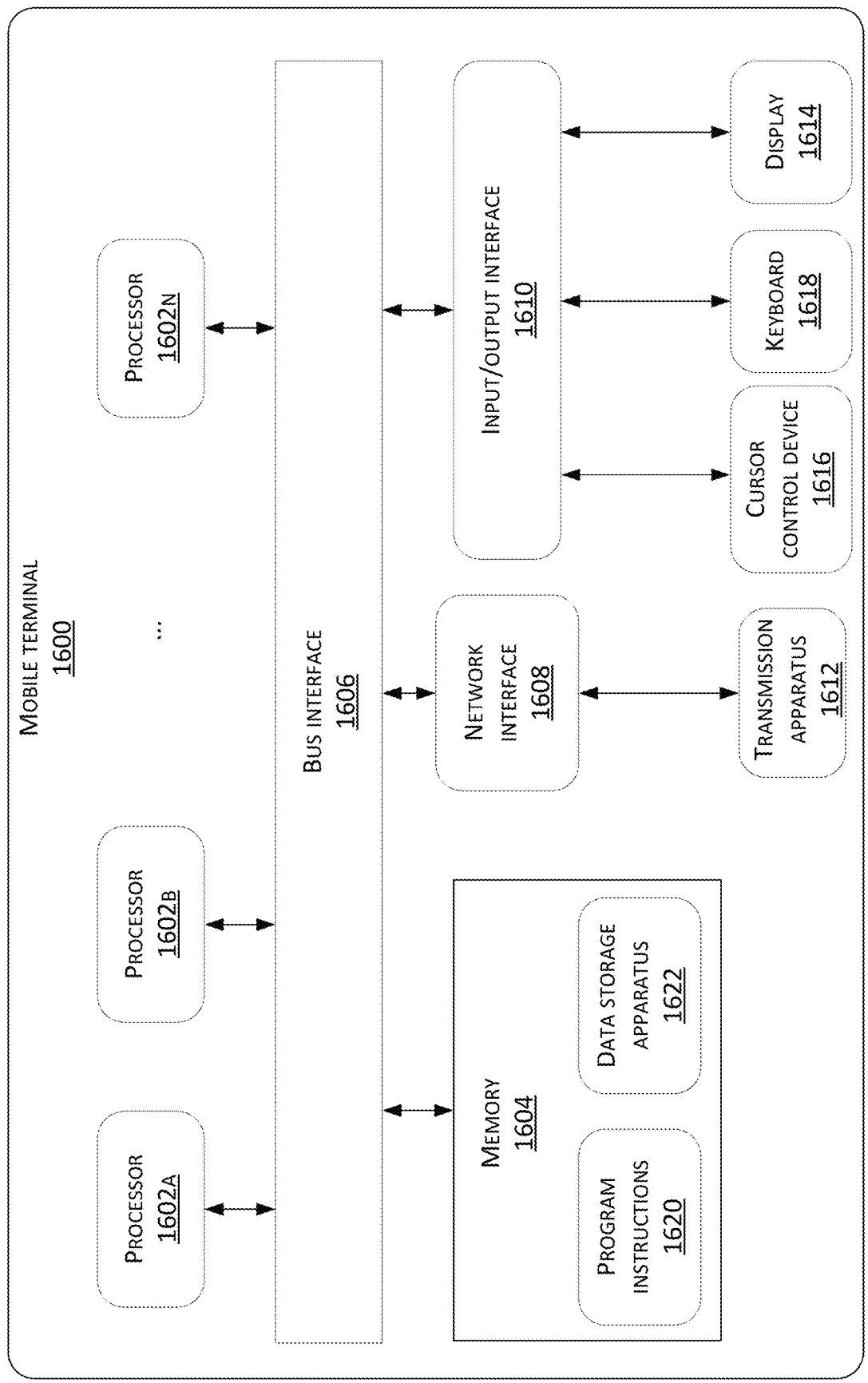
FIG. 16 is a structural block diagram of hardware of a mobile terminal according to an example embodiment of the present disclosure.

FIG. 16 shows a structural block diagram of hardware of a mobile terminal 1600. As shown in FIG. 16, the mobile terminal 1600 may include one or more (only one is shown in the figure) processors 1602a, 1602b, . . . , 1602n, where n may be any integer, (the processor 1602 may include, but is not limited to, a microprogrammed control unit (MCU), a field programmable gate array (FPGA), or other processing apparatuses), a memory 1604 used for storing data. In addition, the mobile terminal 1600 may further include a bus interface 1606 that is connected to the processor 1602, the memory 1604, the network interface 1608, and an input/output interface (I/O interface) 1610. The network interface 1608 is connected to a transmission apparatus 1612 used for a communication function. The I/O interface 1610 may be connected to one or more input/output apparatuses such as a display 1614, a cursor control device 1616, a keyboard 1618, a universal serial bus (USB) port not shown in the FIG. 16 (which may be included as one of the ports of the I/O interface 1610), and/or a camera not shown in the FIG. 16. The mobile terminal 1600 may also include a power source not show in FIG. 16.

Those of ordinary skill in the art may understand that the structure shown in FIG. 16 is merely an example and does not constitute a limitation to the structure of the above electronic apparatus. For example, the mobile terminal 16 may further include more or fewer components than those shown in FIG. 16 or have a configuration different from that shown in FIG. 16.

It should be noted that the above one or more processors 1602 and/or other data processing circuits may generally be referred to as "data processing circuits" herein. The data processing circuit may be completely or partially implemented as software, hardware, firmware, or any other combination. Further, the data processing circuit may be a stand-alone processing module, or be completely or partially integrated into any one of other elements within the mobile terminal 16. As involved in the example embodiments of the present disclosure, the data processing circuit is used as a processor control (e.g., a choice of a variable resistor terminal path connected to an interface).

The processor 1602 may invoke information and an application program stored in the memory through the transmission apparatus, to execute the following steps: acquiring a selected path in a map; and generating a dynamic image of the path based on road condition information of the selected path, wherein the dynamic image of the path is an image moving along the path from an initial position to a final position; and displaying the dynamic image of the path in the map.

The memory 1604 may be used for storing program instructions 1620 or computer-readable instructions and data storage apparatus 1622, such as program instructions/modules corresponding to the method for monitoring a network access state of a distribution in the example embodiments of the present disclosure. The processor 1602 may run the software program and module stored in the memory 1604 to execute various functional applications and data processing, i.e., implement the method for monitoring a network access state of a distribution of the application program. The memory 1604 may include a high-speed random-access memory and may further include a non-volatile memory such as one or more magnetic storage apparatuses, a flash memory, or other non-volatile solid-state memories. In some examples, the memory 164 may further include memories remotely disposed with respect to the processor 162. The remote memories may be connected to the mobile terminal 16 through a network. Examples of the network include, but are not limited to, the Internet, an intranet, a local area network, a mobile communications network, and a combination thereof.

The transmission apparatus 1612 is used for receiving or sending data through a network. Specific examples of the network may include a wireless network provided by a communications provider of the mobile terminal 16. In an example, the transmission apparatus 1612 includes a Network Interface Controller (NIC), which may be connected to another network device through a base station and is thus able to communicate with the Internet. In an example, the transmission apparatus 1612 may be a Radio Frequency (RF) module, which is used for communicating with the Internet in a wireless manner.

The display 1614 may be, for example, a touch screen liquid crystal display (LCD). The liquid crystal display may cause a user to be capable of interacting with a user interface of the mobile terminal 16.

Here, it should be noted that, in some example embodiments, the mobile terminal 1600 shown in above FIG. 16 may include a hardware element (including a circuit), a software element (including a computer code stored on a computer readable medium), or a combination of both the hardware element and the software element. It should be noted that FIG. 16 is merely an example of a particular specific example embodiment and is intended to show the types of components that may exist in the above mobile terminal 16.

Here, it should be noted that, in some example embodiments, the computer terminal shown in the above FIG. 16 has a touch display (also referred to as a "touch screen" or a "touch display screen"). In some example embodiments, the computer terminal shown in the above FIG. 16 has a graphical user interface (GUI), and the user may perform man-machine interaction with the GUI by touching a finger contact and/or gesture on a touch-sensitive surface. Man-machine interaction functions here for example include the following interactions: creating a webpage, drawing, word processing, making an electronic document, playing a game, video conferencing, instant messaging, sending and receiving an email, a calling interface, playing a digital video, playing digital music, and/or web browsing, etc. Executable instructions for executing the above man-machine interaction functions are configured/stored in one or more processor executable computer program products or readable storage media.

In this example embodiment, the above mobile terminal 16 may execute program codes of the following steps in the method for monitoring a network access state of a network distribution device of the application program: a network configuration device acquiring at least one channel, wherein the channel includes at least one of the following channels: a target channel and at least one initial channel, and the target channel is a channel used when the network distribution device is connected to a hotspot successfully; the network configuration device sending a request message to the network distribution device through the at least one channel; and the network configuration device determining, in the case of receiving a response packet, network state information of the network distribution device based on the response packet, wherein the network distribution device feeds back the response packet based on the request message.

For example, the above processor may further execute program codes of the following steps: the network configuration device acquiring the at least one channel, wherein the channel includes at least one of the following channels: a target channel and at least one initial channel, and the target channel is a channel used when the network distribution device is connected to a hotspot successfully; the network configuration device sending the request message to the network distribution device through the at least one channel; and the network configuration device determining, in the case of receiving the response packet, network state information of the network distribution device based on the response packet, wherein the network distribution device feeds back the response packet based on the request message.

For example, the above processor may further execute program codes of the following steps: the network configuration device sending a request message on each channel of the at least one channel sequentially, and determining whether the response packet is received; each time when the network configuration device traverses one channel, the network configuration device sends the request message using the traversed channel, and monitors whether the request message is received on the traversed channel; wherein if the response packet is received, sending the request message on a next channel is stopped, or otherwise, sending the request message on a next channel of the at least one channel is continued, and whether the response packet is received is determined.

For example, the above processor may further execute program codes of the following steps: the network configuration device selecting the target channel or the initial channel by traversing the at least one channel.

For example, the above processor may further execute program code of the following steps: in the case of acquiring channel parameters of the target channel, the selected channel being the target channel, and the network configuration device switching to the target channel to send the request message.

For example, the above processor may further execute program codes of the following steps: the network configuration device selecting the target channel and the at least one initial channel by scanning the at least one channel, and acquiring channel parameters of each channel.

For example, the above processor may further execute program codes of the following steps: in the case of acquiring the channel parameters of each channel, the selected channel being any one of each channel, and the network configuration device switching between each channel to send the request message.

For example, the above processor may further execute program codes of the following steps: the network configuration device returning, in the case of failing in receiving the response packet, to select another channel, and continuing to use the selected channel to monitor the request message sent to the network distribution device.

For example, the request message at least includes: a query request message requesting for acquiring the network state information of the network distribution device, and the response packet at least includes: a query response message containing the network state information of the network distribution device.

For example, the above processor may further execute program codes of the following steps: the network distribution device receiving a network configuration message sent by the network configuration device; the network distribution device acquiring, if the receiving is successful, hotspot information from the network configuration message; the network distribution device initiating connection to a hotspot based on the hotspot information; and in the case where the connection to the hotspot is successful, the network distribution device switching to the target channel, and sending the response packet to the network configuration device through the target channel.

For example, the above processor may further execute program codes of the following steps: the network distribution device presetting the at least one initial channel.

For example, the above processor may further execute program codes of the following steps: in the case where the network distribution device fails in receiving the network configuration message or the network distribution device fails in the connection to the hotspot, the network distribution device sending the response packet to the network configuration device through the initial channel.

For example, the above processor may further execute program codes of the following steps: the network configuration device acquiring the at least one channel, wherein the channel includes at least one of the following channels: a target channel and at least one initial channel, and the target channel is a channel used when the network distribution device is connected to a hotspot successfully; and the network configuration device receiving the response packet returned by the network distribution device using any one or more initial channels, and determining the network state information of the network distribution device based on the response packet, wherein the initial channel is a preset channel representing a connecting channel used by default when network connection between the network distribution device and the network configuration device is successful.

For example, the above processor may further execute program codes of the following steps: the network configuration device acquiring the at least one channel, wherein the channel includes at least one of the following channels: a target channel and at least one initial channel, and the target channel is a channel used when the network distribution device is connected to a hotspot successfully; the network configuration device sending the request message to the network distribution device using any one or more initial channels; and the network configuration device determining, in the case of receiving the response packet, the network state information of the network distribution device based on the response packet, wherein the network distribution device feeds back the response packet based on the request message.

Those of ordinary skill in the art may understand that the structure shown in FIG. 16 is merely an example. The mobile terminal may also be a terminal device, such as a smart phone (e.g., an Android phone, an iOS phone, or the like), a tablet computer, a palmtop computer, a Mobile Internet Device (MID), a PAD, or the like. FIG. 16 does not constitute a limitation to the structure of the above electronic apparatus. For example, the mobile terminal 16 may further include more or fewer components (e.g., network interfaces, or display devices) than the components shown in FIG. 16, or have a configuration different from that shown in FIG. 16.

Those of ordinary skill in the art may understand that all or some steps of the various methods in the foregoing example embodiments may be completed by a program instructing related hardware of the terminal device. The program may be stored in a computer readable storage medium. The storage medium may include: a flash disk, a Read-Only Memory (ROM), a Random-Access Memory (RAM), a magnetic disk, an optical disc, or the like Example Embodiment 11

The example embodiments of the present disclosure further provide a storage medium. For example, in this example embodiment, the storage medium may be used for storing the program codes executed by the method for monitoring a network access state of a network distribution device provided by the above example embodiments, where a program, when running, controls a device where the storage medium is located to execute an example method for monitoring a network access state of a network distribution device according to any one of the example embodiments.

For example, in this example embodiment, the above storage medium may be located in any mobile terminal in a mobile terminal group in a computer network or located in any mobile terminal in a mobile terminal group.

For example, in this example embodiment, the storage medium is configured to store program codes for performing the following steps: a network configuration device acquiring at least one channel, wherein the channel includes at least one of the following channels: a target channel and at least one initial channel, and the target channel is a channel used when the network distribution device is connected to a hotspot successfully; the network configuration device sending a request message to the network distribution device through the at least one channel; and the network configuration device determining, in the case of receiving a response packet, network state information of the network distribution device based on the response packet, wherein the network distribution device feeds back the response packet based on the request message.

For example, in this example embodiment, the storage medium is configured to store program codes for performing the following steps: the network configuration device acquiring the at least one channel, wherein the channel includes at least one of the following channels: a target channel and at least one initial channel, and the target channel is a channel used when the network distribution device is connected to a hotspot successfully; the network configuration device sending the request message to the network distribution device through the at least one channel; and the network configuration device determining, in the case of receiving the response packet, network state information of the network distribution device based on the response packet, wherein the network distribution device feeds back the response packet based on the request message.

For example, in this example embodiment, the storage medium is configured to store program codes for performing the following steps: the network configuration device sending a request message on each channel of the at least one channel sequentially, and determining whether the response packet is received; each time when the network configuration device traverses one channel, the network configuration device sends the request message using the traversed channel, and monitors whether the request message is received on the traversed channel; wherein if the response packet is received, sending the request message on a next channel is stopped, or otherwise, sending the request message on a next channel of the at least one channel is continued, and whether the response packet is received is determined.

For example, in this example embodiment, the storage medium is configured to store program codes for performing the following steps: the network configuration device selecting the target channel or the initial channel by traversing the at least one channel.

For example, in this example embodiment, the storage medium is configured to store program codes for performing the following steps: in the case of acquiring channel parameters of the target channel, the selected channel being the target channel, and the network configuration device switching to the target channel to send the request message.

For example, in this example embodiment, the storage medium is configured to store program codes for performing the following steps: the network configuration device selecting the target channel and the at least one initial channel by scanning the at least one channel, and acquiring channel parameters of each channel.

For example, in this example embodiment, the storage medium is configured to store program codes for performing the following steps: in the case of acquiring the channel parameters of each channel, the selected channel being any one of each channel, and the network configuration device switching between each channel to send the request message.

For example, in this example embodiment, the storage medium is configured to store program codes for performing the following steps: the network configuration device returning, in the case of failing in receiving the response packet, to select another channel, and continuing to use the selected channel to monitor the request message sent to the network distribution device.

For example, the request message at least includes: a query request message requesting for acquiring the network state information of the network distribution device, and the response packet at least includes: a query response message containing the network state information of the network distribution device.

For example, in this example embodiment, the storage medium is configured to store program codes for performing the following steps: the network distribution device receiving a network configuration message sent by the network configuration device; the network distribution device acquiring, if the receiving is successful, hotspot information from the network configuration message; the network distribution device initiating connection to a hotspot based on the hotspot information; and in the case where the connection to the hotspot is successful, the network distribution device switching to the target channel, and sending the response packet to the network configuration device through the target channel.

For example, in this example embodiment, the storage medium is configured to store program codes for performing the following steps: before the network distribution device receives the network configuration message sent by the network configuration device, the method further including: the network distribution device presetting the at least one initial channel.

For example, in this example embodiment, the storage medium is configured to store program codes for performing the following steps: in the case where the network distribution device fails in receiving the network configuration message or the network distribution device fails in the connection to the hotspot, the network distribution device sending the response packet to the network configuration device through the initial channel.

For example, in this example embodiment, the storage medium is configured to store program codes for performing the following steps: the network configuration device acquiring the at least one channel, wherein the channel includes at least one of the following channels: a target channel and at least one initial channel, and the target channel is a channel used when the network distribution device is connected to a hotspot successfully; and the network configuration device receiving the response packet returned by the network distribution device using any one or more initial channels, and determining the network state information of the network distribution device based on the response packet, wherein the initial channel is a preset channel representing a connecting channel used by default when network connection between the network distribution device and the network configuration device is successful.

For example, the above processor may further execute program codes of the following steps: the network configuration device acquiring the at least one channel, wherein the channel includes at least one of the following channels: a target channel and at least one initial channel, and the target channel is a channel used when the network distribution device is connected to a hotspot successfully; the network configuration device sending the request message to the network distribution device using any one or more initial channels; and the network configuration device determining, in the case of receiving the response packet, the network state information of the network distribution device based on the response packet, wherein the network distribution device feeds back the response packet based on the request message.

Example Embodiment 12

The example embodiments of the present disclosure further provide a system, including a processor; and a memory connected to the processor for providing the processor with instructions to process the following processing steps:

a network configuration device acquiring at least one channel, wherein the channel includes at least one of the following channels: a target channel and at least one initial channel, and the target channel is a channel used when a network distribution device is connected to a hotspot successfully;

the network configuration device sending a request message to the network distribution device through the at least one channel; and the network configuration device determining, in the case of receiving a response packet, network state information of the network distribution device based on the response packet, wherein the network distribution device feeds back the response packet based on the request message.

The sequence numbers of the foregoing example embodiments of the present disclosure are merely for the convenience of description, and do not imply the preference among the example embodiments.

In the foregoing example embodiments of the present disclosure, the description of each example embodiment has its own emphasis. For a content that is not detailed in a certain example embodiment, reference may be made to the relevant description of other example embodiments.

In the several example embodiments provided in the present disclosure, it should be understood that the disclosed technical content may be implemented in other manners. The apparatus example embodiments described above are only exemplary. For example, the division of the units is merely a division based on logical functions and there may be other division manners in an actual implementation. For example, a plurality of units or components may be combined or integrated into another system, or some features may be ignored or not performed. In addition, the mutual coupling or direct coupling or communication connections displayed or discussed may be implemented by using some interfaces, and the indirect coupling or communication connections between the units or modules may be implemented electrically or in other forms.

The units described as separate parts may or may not be physically separate. Parts displayed as units may or may not be physical units and may be located in one position or distributed on a plurality of network units. Some or all of the units may be selected according to actual requirements to achieve the objectives of the solutions of this example embodiment.

In addition, functional units in the example embodiments of the present disclosure may be integrated into one processing unit, or each of the units may exist alone physically, or two or more units may be integrated into one unit. The integrated unit may be implemented in the form of hardware or may be implemented in the form of a software functional unit.

When the integrated unit is implemented in the form of a software functional unit and sold or used as an independent product, the integrated unit may be stored in a computer readable storage medium. Based on such understanding, the technical solutions of the present disclosure essentially, or the part that makes contributions to the conventional techniques, or all or a part of the technical solutions may be implemented in the form of a software product. The computer software product is stored in a storage medium and includes several instructions for enabling a computer device (which may be a personal computer, a server, a network device or the like) to perform all or some of the steps of the methods described in the example embodiments of the present disclosure. The foregoing storage medium includes: any medium that may store program codes, such as a USB flash drive, a Read-Only Memory (ROM), a Random-Access Memory (RAM), a mobile hard disk, a magnetic disk, or an optical disc.

The foregoing embodiments are only example embodiments of the present disclosure. It should be noted by those of ordinary skill in the art that some improvements and modifications may still be made without departing from the principle of the present disclosure, and these improvements and modifications should also be construed under the protection scope of the present disclosure.

The present disclosure may further be understood with clauses as follows.

Clause 1. A system for monitoring a network access state of a network distribution device, comprising:

the network distribution device;

a network access device through which the network distribution device accesses a network; and a network configuration device configured to acquire at least one channel, send a request message to the network distribution device through the at least one channel, and determine, in the case of receiving a response packet, network state information of the network distribution device based on the response packet, the network distribution device feeding back the response packet based on the request message, the at least one channel comprising at least one of the following channels: a target channel and at least one initial channel, the target channel being a channel used when the network distribution device is connected to a hotspot successfully.

Clause 2. A method for monitoring a network access state of a network distribution device, comprising:

a network configuration device acquiring at least one channel, wherein the channel comprises at least one of the following channels: a target channel and at least one initial channel, wherein the target channel is a channel used when the network distribution device is connected to a hotspot successfully;

the network configuration device sending a request message to the network distribution device through the at least one channel; and the network configuration device determining network state information of the network distribution device based on a received response packet, wherein the network distribution device feeds back the response packet based on the request message.

Clause 3. The method according to clause 2, wherein the network configuration device sending a request message to the network distribution device through the at least one channel comprises:

the network configuration device sending the request message on each channel of the at least one channel sequentially, and determining whether the response packet is received;

wherein if the response packet is received, sending the request message on a next channel is stopped, or otherwise, sending the request message on a next channel of the at least one channel is continued, and whether the response packet is received is determined.

Clause 4. The method according to clause 2, wherein the network distribution device feeding back the response packet based on the request message comprises:

the network distribution device switching to the initial channel to return a response packet corresponding to the request message.

Clause 5. The method according to clause 2, wherein the request message at least comprises: a query request message requesting for acquiring the network state information of the network distribution device, and the response packet at least comprises: a query response message containing the network state information of the network distribution device.

Clause 6. The method according to any one of clauses 2 to 5, wherein before the network configuration device acquiring at least one channel, the method further comprises:

the network distribution device receiving a network configuration message sent by the network configuration device;

the network distribution device acquiring, if the receiving is successful, hotspot information from the network configuration message;

the network distribution device initiating connection to a hotspot based on the hotspot information; and the network distribution device, in the case where the connection to the hotspot is successful, switching to the target channel, and sending the response packet to the network configuration device through the target channel.

Clause 7. The method according to clause 6, wherein before the network distribution device receiving a network configuration message sent by the network configuration device, the method further comprises: the network distribution device presetting at least one initial channel.

Clause 8. The method according to clause 6, wherein in the case where the network distribution device fails to receive the network configuration message or the network distribution device fails to be connected to the hotspot, the network distribution device sending the response packet to the network configuration device through the initial channel.

Clause 9. A method for monitoring a network access state of a network distribution device, comprising:

a network configuration device acquiring at least one channel, wherein the channel comprises at least one of the following channels: a target channel and at least one initial channel, wherein the target channel is a channel used when the network distribution device is connected to a hotspot successfully;

the network configuration device receiving a response packet returned by the network distribution device using any one or more initial channels, and determining network state information of the network distribution device based on the response packet, wherein the initial channel is a preset channel representing a connecting channel used by default when network connection between the network distribution device and the network configuration device is successful.

Clause 10. A method for monitoring a network access state of a network distribution device, comprising:

a network configuration device acquiring at least one channel, wherein the channel comprises at least one of the following channels: a target channel and at least one initial channel, wherein the target channel is a channel used when the network distribution device is connected to a hotspot successfully;

the network configuration device sending a request message to the network distribution device using any one or more initial channels; and the network configuration device determining, in the case of receiving a response packet, network state information of the network distribution device based on the response packet, wherein the network distribution device feeds back the response packet based on the request message.

Clause 11. A system for monitoring a network access state of a network distribution device, comprising:

the network distribution device;

a network access device through which the network distribution device accesses a network; and a network configuration device configured to acquire at least one channel, and determine, after receiving a response packet returned by the network distribution device using any one or more initial channels, network state information of the network distribution device based on the response packet, the at least one channel comprising at least one of the following channels: an initial channel and a target channel, the target channel being a channel used when the network distribution device is connected to a hotspot successfully, the initial channel being a connecting channel used by default when network connection between the network distribution device and the network configuration device is successful.

Clause 12. A system for monitoring a network access state of a network distribution device, comprising:

the network distribution device;

a network access device through which the network distribution device accesses a network; and a network configuration device configured to acquire at least one channel, and determine, after sending a request message to the network distribution device using any one or more initial channels and in the case of receiving a response packet, network state information of the network distribution device based on the response packet, the network distribution device feeding back the response packet based on the request message, the at least one channel comprising at least one of the following channels: a target channel and at least one initial channel, the target channel being a channel used when the network distribution device is connected to a hotspot successfully.

Clause 13. An apparatus for monitoring a network access state of a network distribution device, comprising:

a first acquiring module configured to acquire at least one channel, the channel comprising at least one of the following channels: a target channel and at least one initial channel, the target channel being a channel used when the network distribution device is connected to a hotspot successfully;

a first sending module configured to send a request message to the network distribution device through the at least one channel; and a first determining module configured to determine, in the case of receiving a response packet, network state information of the network distribution device based on the response packet, the network distribution device feeding back the response packet based on the request message.

Clause 14. An apparatus for monitoring a network access state of a network distribution device, comprising:

a second acquiring module configured to acquire at least one channel, the channel comprising at least one of the following channels: a target channel and at least one initial channel, the target channel being a channel used when the network distribution device is connected to a hotspot successfully; and a first receiving module configured to receive a response packet returned by the network distribution device using any one or more initial channels, and determine network state information of the network distribution device based on the response packet, the initial channel being a preset channel representing a connecting channel used by default when network connection between the network distribution device and the network configuration device is successful.

Clause 15. An apparatus for monitoring a network access state of a network distribution device, comprising:
a third acquiring module configured for a network configuration device to acquire at least one channel, the channel comprising at least one of the following channels: a target channel and at least one initial channel, the target channel being a channel used when the network distribution device is connected to a hotspot successfully;
a second sending module configured to send a request message to the network distribution device using any one or more initial channels; and
a second determining module configured to determine, in the case of receiving a response packet, network state information of the network distribution device based on the response packet, the network distribution device feeding back the response packet based on the request message.

Clause 16. A storage medium comprising a stored program, wherein the program, when running, controls a device where the storage medium is located to execute the method for monitoring a network access state of a network distribution device according to any one of clauses 2 to 10.

Clause 17. A processor, the processor being configured to run a program, wherein the program, when running, executes the method for monitoring a network access state of a network distribution device according to any one of clauses 2 to 10.

Clause 18. A system, comprising:
a processor; and
a memory connected to the processor for providing the processor with instructions to process the following processing steps:
a network configuration device acquiring at least one channel, wherein the channel comprises at least one of the following channels: a target channel and at least one initial channel, wherein the target channel is a channel used when a network distribution device is connected to a hotspot successfully;
the network configuration device sending a request message to the network distribution device through the at least one channel; and
the network configuration device determining, in the case of receiving a response packet, network state information of the network distribution device based on the response packet, wherein the network distribution device feeds back the response packet based on the request message.

What is claimed is:
1. A method comprising:
acquiring, by a network configuration device, at least one channel;
sending, by the network configuration device, a request message to a network distribution device via a respect channel of the at least one channel sequentially;
determining, by the network configuration device, that a response packet from the network distribution device is not received;
sending, by the network configuration device, the request message via a next channel of the at least one channel; and
determining, by the network configuration device, that network state information of the network distribution device based on the response packet is received from the network distribution device.

2. The method of claim 1, wherein the network distribution device sends the response packet based on the request message.

3. The method of claim 1, wherein the at least one channel comprises at least one of: a target channel and at least one initial channel, wherein the target channel is a channel used when the network distribution device is connected to a hotspot successfully.

4. The method of claim 1, further comprising:
stopping sending, by the network configuration device, the request message to the network distribution device.

5. The method of claim 1, wherein the request message comprises a query request message requesting for acquiring the network state information of the network distribution device.

6. The method of claim 1, wherein the response packet comprises a query response message containing the network state information of the network distribution device.

7. The method of claim 1, wherein the network configuration device configures a network to which the network distribution device accesses.

8. The method of claim 1, wherein the network distribution device accesses a wireless local area network hotspot.

9. One or more memories storing computer-readable instructions that, executable by one or more processors of a network configuration device, cause the one or more processors to perform acts comprising:
acquiring at least one channel;
sending, to a network distribution device via one or more initial channel of the at least one channel, a request message for acquiring wireless local area network (WLAN) network state information of the network distribution device, the WLAN network state information including network condition information of a WLAN hotspot;
upon determining that a response packet from the network distribution device is not received, sending, to the network distribution device, the request message via a next channel of the at least one channel;
receiving the response packet returned by the network distribution device in response to sending the request message using the next channel of the at least one channel; and
determining the WLAN network state information of the network distribution device based on the response packet.

10. The one or more memories of claim 9, wherein:
the at least one channel comprises at least one of: a target channel and at least one initial channel,
the target channel is a channel used when the network distribution device is connected to a hotspot successfully; and
an initial channel is a preset channel representing a connecting channel used by default when a network connection between the network distribution device and the network configuration device is successful.

11. The one or more memories of claim 9, wherein the network distribution device accesses the WLAN hotspot.

12. The one or more memories of claim 9, wherein the network configuration device configures a network to which the network distribution device accesses.

13. The one or more memories of claim 9, wherein the response packet comprises a query response message containing the network state information of the network distribution device.

14. The one or more memories of claim 9, wherein the request message comprises a query request message requesting for acquiring the network state information of the network distribution device.

15. A network configuration device comprising:
one or more processors; and
one or more memories storing computer readable instructions that, executable by the one or more processors, cause the one or more processors to perform acts comprising:
acquiring at least one channel;
sending a request message to a network distribution device via a respect channel of the at least one channel sequentially;
determining that a response packet from the network distribution device is not received;
sending the request message via a next channel of the at least one channel; and
determining that network state information of the network distribution device based on the response packet is received from the network distribution device.

16. The network configuration device of claim 15, wherein the acts further comprise:
stopping sending the request message to the network distribution device.

17. The network configuration device of claim 15, wherein the at least one channel comprises at least one of: a target channel and at least one initial channel, wherein the target channel is a channel used when the network distribution device is connected to a hotspot successfully.

18. The network configuration device of claim 15, wherein the request message comprises a query request message requesting for acquiring the network state information of the network distribution device.

19. The network configuration device of claim 15, wherein the response packet comprises a query response message containing the network state information of the network distribution device.

20. The network configuration device of claim 15, wherein the network configuration device configures a network to which the network distribution device accesses.

* * * * *